(12) United States Patent  
Luo et al.

(10) Patent No.: US 11,700,097 B2  
(45) Date of Patent: *Jul. 11, 2023

(54) TRANSPORT BLOCK SEGMENTATION AND SIGNALING

(71) Applicant: QUALCOMM Incorporated, San Diego, CA (US)

(72) Inventors: Tao Luo, San Diego, CA (US); Alexandros Manolakos, San Diego, CA (US); Joseph Binamira Soriaga, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/366,625

(22) Filed: Jul. 2, 2021

(65) Prior Publication Data

US 2021/0376979 A1 Dec. 2, 2021

Related U.S. Application Data

(63) Continuation of application No. 16/425,185, filed on May 29, 2019, now Pat. No. 11,082,177, which is a (Continued)

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0007* (2013.01); *H04L 1/0071* (2013.01);
(Continued)

(58) Field of Classification Search
None
See application file for complete search history.

(56) References Cited

U.S. PATENT DOCUMENTS 6,337,642 B1 1/2002 Yagil
8,375,271 B2 2/2013 Cheng et al.
(Continued)

FOREIGN PATENT DOCUMENTS

EP 2129030 B1 10/2010
EP 2086143 A3 4/2012
(Continued)

OTHER PUBLICATIONS

European Search Report—EP19208006—Search Authority—Munich—dated Mar. 9, 2020.
(Continued)

*Primary Examiner* — Saad Khawar
(74) *Attorney, Agent, or Firm* — Holland & Hart/Qualcomm

(57) ABSTRACT

Methods, systems, and devices for wireless communication are described. A method may include identifying a reference number of tones for an overhead channel of a transport block and segmenting the transport block into a code block based at least in part on the reference number of tones for the overhead channel. In some examples, a code block indicator or the reference number of tones may be transmitted on a control channel. Another method may include receiving a code block size indicator associated with a code block of a transport block, decoding the code block based at least in part on the code block size indicator and assembling the transport block based at least in part on the decoded code block. In some examples, the code block size indicator may be received using a control channel.

26 Claims, 18 Drawing Sheets

Related U.S. Application Data continuation of application No. 15/178,957, filed on Jun. 10, 2016, now Pat. No. 10,348,466.

(60) Provisional application No. 62/261,820, filed on Dec. 1, 2015, provisional application No. 62/250,420, filed on Nov. 3, 2015.

(51) Int. Cl.
*H04L 1/04* (2006.01)
*H04W 28/06* (2009.01)
*H04L 1/1867* (2023.01)

(52) U.S. Cl.
CPC .............. *H04L 1/04* (2013.01); *H04L 5/0044* (2013.01); *H04L 5/0055* (2013.01); *H04W 28/065* (2013.01); *H04L 1/0003* (2013.01); *H04L 1/1867* (2013.01)

(56) References Cited

U.S. PATENT DOCUMENTS

| | | | |
|---|---|---|---|
| 8,379,738 | B2 | 2/2013 | Pi et al. |
| 8,537,750 | B2 | 9/2013 | Jin et al. |
| 8,644,229 | B2 | 2/2014 | Iacono et al. |
| 8,839,079 | B2 | 9/2014 | Chen et al. |
| 8,937,906 | B2 | 1/2015 | Chen et al. |
| 9,054,849 | B2 | 6/2015 | Myung et al. |
| 9,130,784 | B2 | 9/2015 | Nimbalker et al. |
| 9,160,485 | B2 | 10/2015 | Kim et al. |
| 9,253,651 | B2 | 2/2016 | Palanki et al. |
| 9,300,431 | B2 | 3/2016 | Hosangadi et al. |
| 9,548,838 | B2 | 1/2017 | Lahetkangas et al. |
| 10,348,466 | B2 * | 7/2019 | Luo ..................... H04W 28/065 |
| 11,082,177 | B2 * | 8/2021 | Luo ..................... H04L 5/0044 |
| 2006/0104379 | A1 | 5/2006 | Li et al. |
| 2009/0199066 | A1 | 8/2009 | Kim et al. |
| 2010/0202386 | A1 | 8/2010 | Takaoka et al. |
| 2011/0085508 | A1 | 4/2011 | Wengerter et al. |
| 2011/0261775 | A1 | 10/2011 | Kim et al. |
| 2011/0268043 | A1 | 11/2011 | Golitschek |
| 2012/0002657 | A1 | 1/2012 | Seyama et al. |
| 2012/0014242 | A1 | 1/2012 | Kim et al. |
| 2012/0087396 | A1 | 4/2012 | Nimbalker et al. |
| 2012/0246548 | A1 | 9/2012 | Buckley et al. |
| 2012/0275539 | A1 | 11/2012 | Maltxev et al. |
| 2012/0320852 | A1 | 12/2012 | Seo et al. |
| 2013/0242729 | A1 | 9/2013 | Chen et al. |
| 2013/0258914 | A1 | 10/2013 | Seo et al. |
| 2013/0329661 | A1 | 12/2013 | Chen et al. |
| 2014/0064413 | A1 | 3/2014 | Huebner et al. |
| 2014/0136922 | A1 | 5/2014 | Oketani |
| 2014/0153484 | A1 * | 6/2014 | Kim ..................... H04L 1/0061 370/328 |
| 2014/0204878 | A1 | 7/2014 | Jang et al. |
| 2015/0195068 | A1 | 7/2015 | Kim et al. |
| 2015/0207601 | A1 | 7/2015 | Kim et al. |
| 2015/0271802 | A1 | 9/2015 | Kang et al. |
| 2015/0319776 | A1 | 11/2015 | Seo et al. |
| 2015/0358117 | A1 * | 12/2015 | Li ..................... H04L 1/0001 370/329 |
| 2015/0381209 | A1 | 12/2015 | Roh et al. |
| 2017/0126378 | A1 | 5/2017 | Luo et al. |
| 2017/0195082 | A1 | 7/2017 | Roh et al. |
| 2018/0084572 | A1 * | 3/2018 | You ..................... H04W 72/1289 |
| 2019/0280838 | A1 | 9/2019 | Luo et al. |

FOREIGN PATENT DOCUMENTS

| | | |
|---|---|---|
| EP | 2624626 A1 | 8/2013 |
| EP | 2183867 B1 | 5/2014 |
| EP | 3110052 A1 | 12/2016 |
| EP | 3179644 A1 | 6/2017 |
| EP | 3183832 A1 | 6/2017 |
| EP | 3226458 A1 | 10/2017 |
| EP | 3285423 A1 | 2/2018 |
| EP | 3474475 A1 | 4/2019 |
| EP | 3484113 A1 | 5/2019 |
| EP | 3487095 A1 | 5/2019 |
| EP | 3487096 A1 | 5/2019 |
| JP | 2011517889 A | 6/2011 |
| JP | 2012529876 A | 11/2012 |
| JP | 2013176069 A | 9/2013 |
| KR | 20140134207 A | 11/2014 |
| WO | WO2010118592 A1 | 10/2010 |
| WO | WO2010127332 | 11/2010 |
| WO | WO2012042889 A1 | 4/2012 |
| WO | WO2013067112 | 5/2013 |
| WO | WO2014031450 | 2/2014 |
| WO | WO2014088294 A1 | 6/2014 |
| WO | WO2015126114 A1 | 8/2015 |
| WO | WO2016010354 A1 | 1/2016 |
| WO | WO2017076335 A1 | 5/2017 |
| WO | WO2017121620 A1 | 7/2017 |
| WO | WO2017184850 A1 | 10/2017 |
| WO | WO2018028655 A1 | 2/2018 |
| WO | WO2018030736 A1 | 2/2018 |

OTHER PUBLICATIONS

Hu J., et al., "On LTE Coding Scheme Inefficiency & Potential Improvement," IEEE 17th International Symposium on Wireless Personal Multimedia Communications (WPMC), Sep. 7-10, 2014, 5 pages.

Huawei et al., "TBS table for Ul 256QAM," Discussion and Decision, 3GPP TSG RAN WG1 Meeting #85, R1-164091, Agenda Item: 6.2.8, Nanjing, China, May 23-27, 2016, 6 pages.

International Preliminary Report on Patentability—PCT/US2016/048829, The International Bureau of WIPO—Geneva, Switzerland, dated May 17, 2018.

International Search Report and Written Opinion—PCT/US2016/048829—ISA/EPO—dated Feb. 1, 2017.

Lenzi K.G., et al., "On the Performance of Code Block Segmentation for LTE-Advanced," IEEE 24th International Conference on Application-Specific Systems, Architectures and Processors, Jun. 5-7, 2013, pp. 253-256.

Motorola Mobility: "On support of Dl 256-QAM," Discussion/Decision, 3GPP TSG RAN WG1 Meeting #76, R1-140675, Agenda Item: 7.2.4.1, Prague, Czech Republic, Feb. 10-14, 2014, 3 pages.

Motorola: "Limited Buffer Rate Matching Performance Analysis," Discussion and Decision, 3GPP TSG RAN1 #51 bis, R1-080057, Agenda Item: 6.2, Sevilla, Spain, Jan. 14-18, 2008, 15 pages.

Motorola: "RE Sizing for Turbo Code Block Segments," Discussion and Decision, 3GPP TSG RAN1 #49bis, R1-072673, Agenda Item: 7.5, Orlando, USA, Jun. 25-29, 2007, 4 pages.

Partial International Search Report—PCT/US2016/048829—ISA/EPO—dated Dec. 7, 2016.

Spreadtrum Communications: "Code segmentation and CRC issues for LDPC codes," Discussion and decision, 3GPP TSG RAN WG1 meeting #86bis, R1-1608921, Agenda Item: 8.1.3.1, Lisbon, Portugal, Oct. 10-14, 2016, 3 pages.

\* cited by examiner

TRANSPORT BLOCK SEGMENTATION AND SIGNALING

CROSS REFERENCES

The present Application for Patent is a Continuation of U.S. patent application Ser. No. 16/425,185 by Luo et al., entitled "Transport Block Segmentation and Signaling" filed May 29, 2019, which is a Continuation of U.S. patent application Ser. No. 15/178,957 by Luo, et al., entitled "Transport Block Segmentation and Signaling" filed Jun. 10, 2016, which claims priority to U.S. Provisional Patent Application No. 62/250,420 by Luo et al., entitled "Transport Block Segmentation and Signaling," filed Nov. 3, 2015; and U.S. Provisional Patent Application No. 62/261,820 by Luo et al., entitled "Transport Block Segmentation and Signaling," filed Dec. 1, 2015; each of which is assigned to the assignee hereof.

BACKGROUND

The following relates generally to wireless communication, and more specifically to transport block (TB) segmentation and signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, power, etc.). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some deployments, UEs and base stations may rely on retransmissions of data in TBs in order to successfully receive and decode transmitted data. For example, a UE may generate feedback, such as an acknowledgment (ACK) or a negative acknowledgment (NACK) signal, which may be transmitted to the transmitting device, such as a base station, to indicate whether a TB was successfully received and decoded, which may prompt the transmitting device to retransmit the TB (e.g., in case of a NACK feedback). In some cases, TBs may include a number of code blocks (CBs) that are transmitted by a UE or a base station. CB sizes within a TB may be determined by a number of factors, such as a size of the TB, coding rate, modulation order, or interleaver characteristics, among others.

SUMMARY

The present disclosure, for example, relates to techniques for transport block (TB) segmentation and signaling in wireless communication systems. Various aspects of the disclosure provide segmentation of a TB into one or more code blocks (CBs). The number of CBs into which a TB is segmented may be determined based on a reference number of tones of an overhead channel. For example, if an overhead channel is allocated one or more resource blocks (RBs) in a subframe during retransmission of a TB, the TB may be segmented into one or more CBs based on the number of RBs allocated for the overhead channel. In certain examples, based at least in part on the reference number of tones of the overhead channel, the number of CBs may be determined for retransmission of the TB.

In examples where a TB is segmented into one or more CBs, the one or more CBs may be transmitted from a transmitting device to a receiving device. In some examples, a CB size indicator or the reference number of tones may be optionally transmitted to the receiving device. The CB size indicator or the reference number of tones may be used to decode the one or more CBs received at the receiving device. In certain examples, the TB may be assembled based at least in part on the CB size indicator or the reference number of tones.

A method of wireless communication is described. The method may include identifying a reference number of tones for an overhead channel of a TB and segmenting the TB into a CB based at least in part on the reference number of tones for the overhead channel.

An apparatus for wireless communication is described. The apparatus may include means for identifying a reference number of tones for an overhead channel of a TB and means for segmenting the TB into a CB based at least in part on the reference number of tones for the overhead channel.

A further apparatus for wireless communication is described. The apparatus may include a processor, memory in electronic communication with the processor, and instructions stored in the memory. The instructions may be operable to cause the processor to identify a reference number of tones for an overhead channel of a TB and segment the TB into a CB based at least in part on the reference number of tones for the overhead channel.

A non-transitory computer readable medium for wireless communication is described. The non-transitory computer-readable medium may include instructions operable to cause a processor to identify a reference number of tones for an overhead channel of a TB and segment the TB into a CB based at least in part on the reference number of tones for the overhead channel.

Some examples of the method, apparatus, or non-transitory computer-readable medium described above may further include processes, features, means, or instructions for transmitting, on a control channel, a CB size indicator or the reference number of tones.

Some examples of the method, apparatus, or non-transitory computer-readable medium described above may further include processes, features, means, or instructions for determining an actual number of tones associated with the overhead channel, wherein segmenting the TB into the CB is further based at least in part on the actual number of tones.

In some examples of the method, apparatus, or non-transitory computer-readable medium described above, identifying the reference number of tones for the overhead channel is based at least in part on a communication link direction associated with the overhead channel. In some examples, the communication link direction comprises uplink, downlink, or sidelink.

In some examples of the method, apparatus, or non-transitory computer-readable medium described above, the reference number of tones for the overhead channel is based at least in part on one or more of a control channel in a data region of the TB, a synchronization channel, or a channel state information reference signal (CSI-RS).

In some examples of the method, apparatus, or non-transitory computer-readable medium described above, the reference number of tones for the overhead channel is based at least in part on one or more of a maximum number of tones, a minimum number of tones, or a median number of tones associated with the overhead channel.

Some examples of the method, apparatus, or non-transitory computer-readable medium described above may further include processes, features, means, or instructions for determining a number of information bits for the TB based at least in part on a number of CBs associated with the TB and a number of information bits for the CBs.

Some examples of the method, apparatus, or non-transitory computer-readable medium described above may further include processes, features, means, or instructions for determining the number of information bits for the CBs based at least in part on a CB size and a code rate.

Some examples of the method, apparatus, or non-transitory computer-readable medium described above may further include processes, features, means, or instructions for determining the number of CBs associated with the TB based at least in part on a number of RBs allocated for the TB and the reference number of tones for the overhead channel.

Some examples of the method, apparatus, or non-transitory computer-readable medium described above may further include processes, features, means, or instructions for determining a number of pad bits for the TB based at least in part on an actual number of tones associated with the overhead channel.

Some examples of the method, apparatus, or non-transitory computer-readable medium described above may further include processes, features, means, or instructions for determining a number of punctured bits for the CB based at least in part on an actual number of tones associated with the overhead channel.

Some examples of the method, apparatus, or non-transitory computer-readable medium described above may further include processes, features, means, or instructions for identifying a plurality of tone bundles associated with the CB. Some examples of the method, apparatus, or non-transitory computer-readable medium described above may further include processes, features, means, or instructions for determining an interleaver matrix based at least in part on the number of punctured bits for the CB. Some examples of the method, apparatus, or non-transitory computer-readable medium described above may further include processes, features, means, or instructions for interleaving the plurality of tone bundles according to the interleaver matrix.

Some examples of the method, apparatus, or non-transitory computer-readable medium described above may further include processes, features, means, or instructions for determining an interleaver matrix based at least in part on the reference number of tones for the overhead channel. Some examples of the method, apparatus, or non-transitory computer-readable medium described above may further include processes, features, means, or instructions for interleaving a plurality of tones of the CB according to the interleaver matrix.

In some examples of the method, apparatus, or non-transitory computer-readable medium described above, interleaving the plurality of tones comprises: writing the plurality of tones to elements of the interleaver matrix according to a first order. Some examples of the method, apparatus, or non-transitory computer-readable medium described above may further include processes, features, means, or instructions for reading the elements of the interleaver matrix according to a second order.

A method of wireless communication is described. The method may include receiving a CB size indicator associated with a CB of a TB, decoding the CB based at least in part on the CB size indicator, and assembling the TB based at least in part on the decoded CB.

An apparatus for wireless communication is described. The apparatus may include means for receiving a CB size indicator associated with a CB of a TB, means for decoding the CB based at least in part on the CB size indicator, and means for assembling the TB based at least in part on the decoded CB.

A further apparatus for wireless communication is described. The apparatus may include a processor, memory in electronic communication with the processor, and instructions stored in the memory. The instructions may be operable to cause the processor to receive a CB size indicator associated with a CB of a TB, decode the CB based at least in part on the CB size indicator, and assemble the TB based at least in part on the decoded CB.

A non-transitory computer readable medium for wireless communication is described. The non-transitory computer-readable medium may include instructions operable to cause a processor to receive a CB size indicator associated with a CB of a TB, decode the CB based at least in part on the CB size indicator, and assemble the TB based at least in part on the decoded CB.

Some examples of the method, apparatus, or non-transitory computer-readable medium described above may further include processes, features, means, or instructions for receiving the CB size indicator using a control channel.

In some examples of the method, apparatus, or non-transitory computer-readable medium described above, the CB size indicator is based at least in part on a reference number of tones associated with an overhead channel of the TB.

Some examples of the method, apparatus, or non-transitory computer-readable medium described above may further include processes, features, means, or instructions for receiving the reference number of tones using a control channel.

In some examples of the method, apparatus, or non-transitory computer-readable medium described above, the reference number of tones is based at least in part on one or more of a control channel in a data region of the TB, a synchronization channel, or a CSI-RS.

In some examples of the method, apparatus, or non-transitory computer-readable medium described above, the reference number of tones is based at least in part on one or more of a maximum number of tones, a minimum number of tones, or a median number of tones associated with the overhead channel.

In some examples of the method, apparatus, or non-transitory computer-readable medium described above, the CB size indicator is based at least in part on an actual number of tones for an overhead channel associated with the TB.

In some examples of the method, apparatus, or non-transitory computer-readable medium described above, decoding the CB comprises: determining a deinterleaver matrix based at least in part on the CB size indicator. Some examples of the method, apparatus, or non-transitory computer-readable medium described above may further include processes, features, means, or instructions for deinterleaving the CB according to the deinterleaver matrix. Some examples of the method, apparatus, or non-transitory computer-readable medium described above may further include processes, features, means, or instructions for decoding the deinterleaved CB.

In some examples of the method, apparatus, or non-transitory computer-readable medium described above, deinterleaving the CB according to the deinterleaver matrix comprises: writing plurality of tones of the CB to elements of the deinterleaver matrix according to a first order. Some examples of the method, apparatus, or non-transitory computer-readable medium described above may further include processes, features, means, or instructions for reading the elements of the deinterleaver matrix according to a second order.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
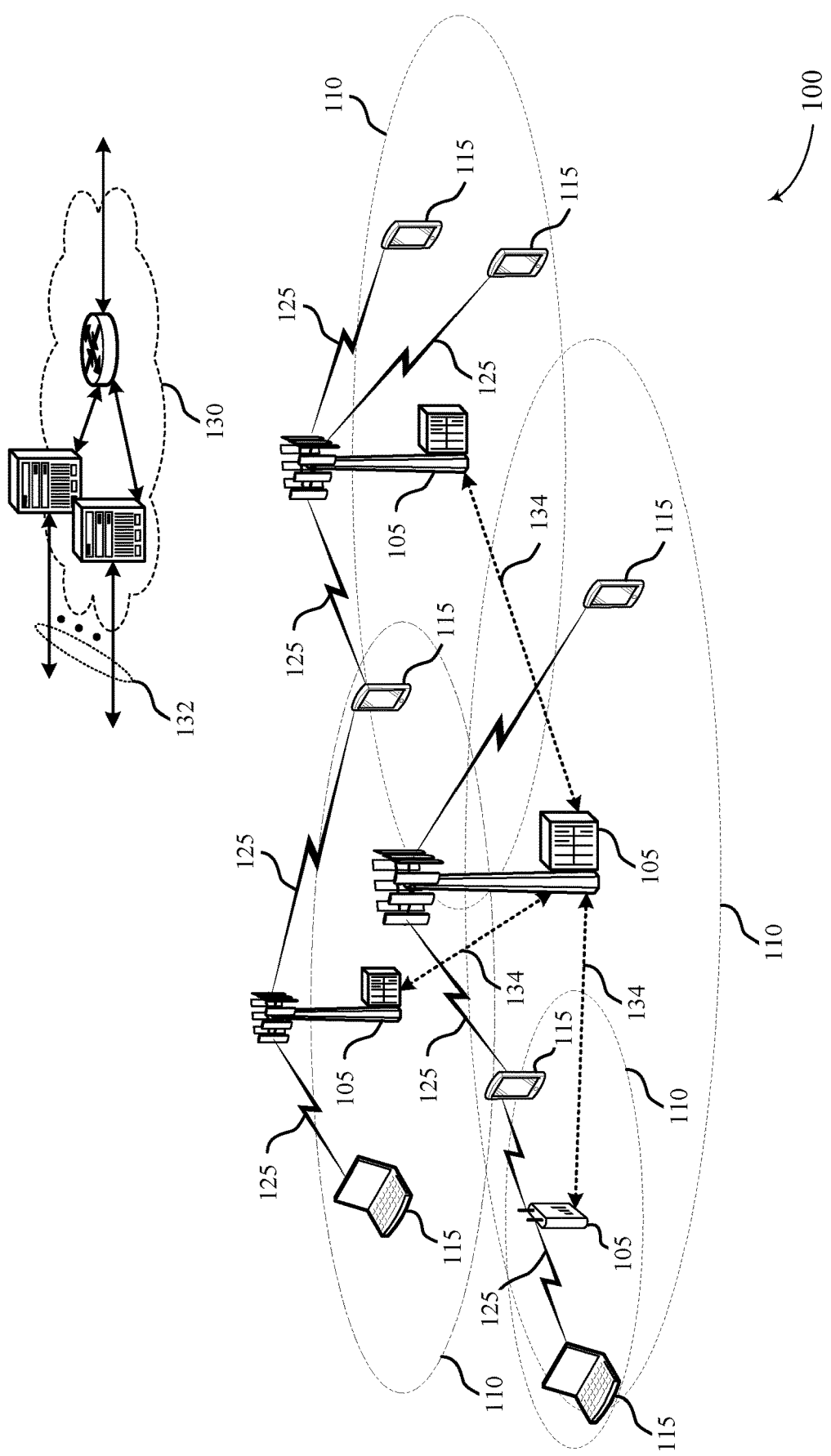
FIG. 1 illustrates an example of a wireless communications system that supports transport block (TB) segmentation and signaling in accordance with aspects of the present disclosure.

Techniques for transport block (TB) segmentation and signaling in a wireless communication system are described.

As mentioned above, in wireless communication systems, a TB may be segmented into one or more code blocks (CBs) and transmitted from a transmitting device to a receiving device. In case of TB transmission or reception failure, a retransmission procedure, such as Hybrid Automatic Repeat Request (HARD), may be performed. During the retransmission procedure, the receiving device may transmit a feedback signal, such as an acknowledgement (ACK) or a negative ACK (NACK) signal, to the transmitting device to indicate whether the TB was received and successfully decoded. If the transmitting device receives a NACK from the receiving device, the transmitting device may retransmit the initial TB in a second transmission. In certain examples, the receiving device may store the initial TB (even if unsuccessfully decoded) and upon reception of the retransmitted TB, may combine the initial TB and the retransmitted TB to successfully decode the TB.

In some wireless communications systems, the transmission frame size is fixed, while in other wireless communication systems, transmission frame size can vary depending on the bandwidth requested for a given transmission or the resources available, among other factors. In a Long Term Evolution (LTE) or LTE-Advanced (LTE-A) communications system, for example, the transmission frame size is fixed at 10 ms. As such, transmission bandwidth cannot be increased by increasing a transmission frame size. In such a system, in order to efficiently utilize the fixed transmission frame size, a TB may be segmented into one or more CBs and mapped to resources within the transmission frame.

According to some aspects of the disclosure, if the number of bits in a TB, which may also be referred to as a TB size, is greater than the number of coded bits that a receiving device is capable of decoding, the TB may be segmented into one or more CBs to be transmitted to the receiving device. Furthermore, during a retransmission procedure, in order to combine the initial TB and the retransmitted TB, the CB size, the number of CBs, or the Modulation and Coding Scheme (MCS), may need to be the same in both the initial transmission of the TB and the retransmission of the TB.

A TB size may be determined based at least in part on, for example, available resources (e.g., resource blocks (RBs)), a number of transmission time intervals (TTIs), a spatial multiplexing rank, the MCS for the transmission (e.g., indicating a modulation order and coding rate), as well as a number of tones allocated for control channels and/or overhead channels. Using such information, a number of available modulation symbols may be determined (e.g., by counting available resource elements (REs) in an RB), a number of available coded bits may be determined (e.g., by multiplying the modulation order implied by the MCS), a number of available information bits for the transmission may be determined (e.g., by using the data rate implied by the MCS), and CB size and a number of CBs may be determined (e.g., by using the TB size and number of RBs available).

As described herein, one or more tones may refer to one or more REs of an RB or one or more RBs. For example, one or more tones may be available for transmission of data, while one or more other tones may be available for transmission of control information. In some examples, one or more tones may refer to all of the REs of an RB, multiple RBs, or may include REs from multiple RBs.

As reception of the ACK/NACK feedback from the receiving device does not occur instantaneously, retransmission of the TB may be performed in a subframe (a second subframe) after the subframe in which the initial TB was transmitted (a first subframe). In some cases, the number of tones allocated for control channels and/or overhead channels in the first subframe may be different than the number of tones allocated for control channels and/or overhead channels in the second subframe. As such, the determined number of CBs, the determined CB size, the MCS, and/or the available resources may differ between the first and second subframes. However, the number of CBs, the CB size, the number of information bits per CB, and the MCS may need to remain the same between the first subframe and the second subframe in order to successfully combine an initial TB with a retransmitted TB.

In some examples, the number of tones available for data transmission varies for each transmission due to the fixed frame and subframe sizes and the varying number of tones allocated for control channels and/or overhead channels in each transmission. Accordingly, accurately determining the number of CBs and the CB size for segmentation of a TB based on a reference number of tones allocated for an overhead channel may enhance retransmission techniques. In certain examples, a reference number of tones may refer to the number of tones used to determine segmentation of a TB. While the reference number of tones may be determined based on an actual number of tones, the reference number of tones may not be an actual number of tones in a given subframe. In some examples, the reference number of tones may be a maximum, minimum, median, average, or estimated number of tones transmitted or scheduled to be transmitted using one or more REs of an RB. In some aspects, the reference number of tones may be determined to avoid excessive puncturing in which useable tones are reduced based on the overhead channels.

In order to minimize the number of information bits used for signaling the TB (for encoding or decoding), the MCS index (modulation order and code) rate and the number of layers or rank may be used. The MCS index and/or the number of layers may be carried in a control channel, such as a Physical Downlink Control Channel (PDCCH). In addition, to minimize the number of information bits for signaling the TB (for encoding or decoding), the CB size and the TB size may also be used. The CB size may be signaled in a PDCCH, for example, and the TB size may be determined based on the number of allocated RBs and the MCS index.

Aspects of the disclosure are initially described in the context of a wireless communication system. Aspects of the disclosure are also illustrated by and described in the context of a process flow, examples of TB segmentation, and a flow chart, each of which support TB segmentation and signaling. Aspects of the disclosure are further illustrated by and described with reference to apparatus diagrams, system diagrams, and flowcharts that relate to TB segmentation and signaling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may support an LTE/LTE-A network. The wireless communications system 100 may support TB segmentation and signaling and in particular, segmentation of a TB into one or more CBs. The number of CBs into which a TB is segmented may be determined based on a reference number of tones of an overhead channel. In examples where a TB is segmented into one or more CBs, the one or more CBs may be transmitted from a transmitting device to a receiving device. The transmitting device may be a base station 105 or a UE 115, and the receiving device may be a base station 105 or a UE 115. For example where the communication link direction is uplink, the transmitting device may be a UE 115 and the receiving device may be a base station 105. In an example where the communication link direction is downlink, the transmitting device may be a base station 105 and the receiving device may be a UE 115. In some examples the communication link direction may be sidelink (e.g., a device-to-device communication link), where the transmitting device is a first UE 115 and the receiving device is a second UE 115.

In some examples, a CB size indicator or the reference number of tones may be optionally transmitted to the receiving device. The CB size indicator or the reference number of tones may be used to decode the one or more CBs received at the receiving device. In certain examples, the TB may be assembled based at least in part on the CB size indicator or the reference number of tones.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, downlink transmissions from a base station 105 to a UE 115, or sidelink transmissions from a UE 115 to another UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Figure 2:
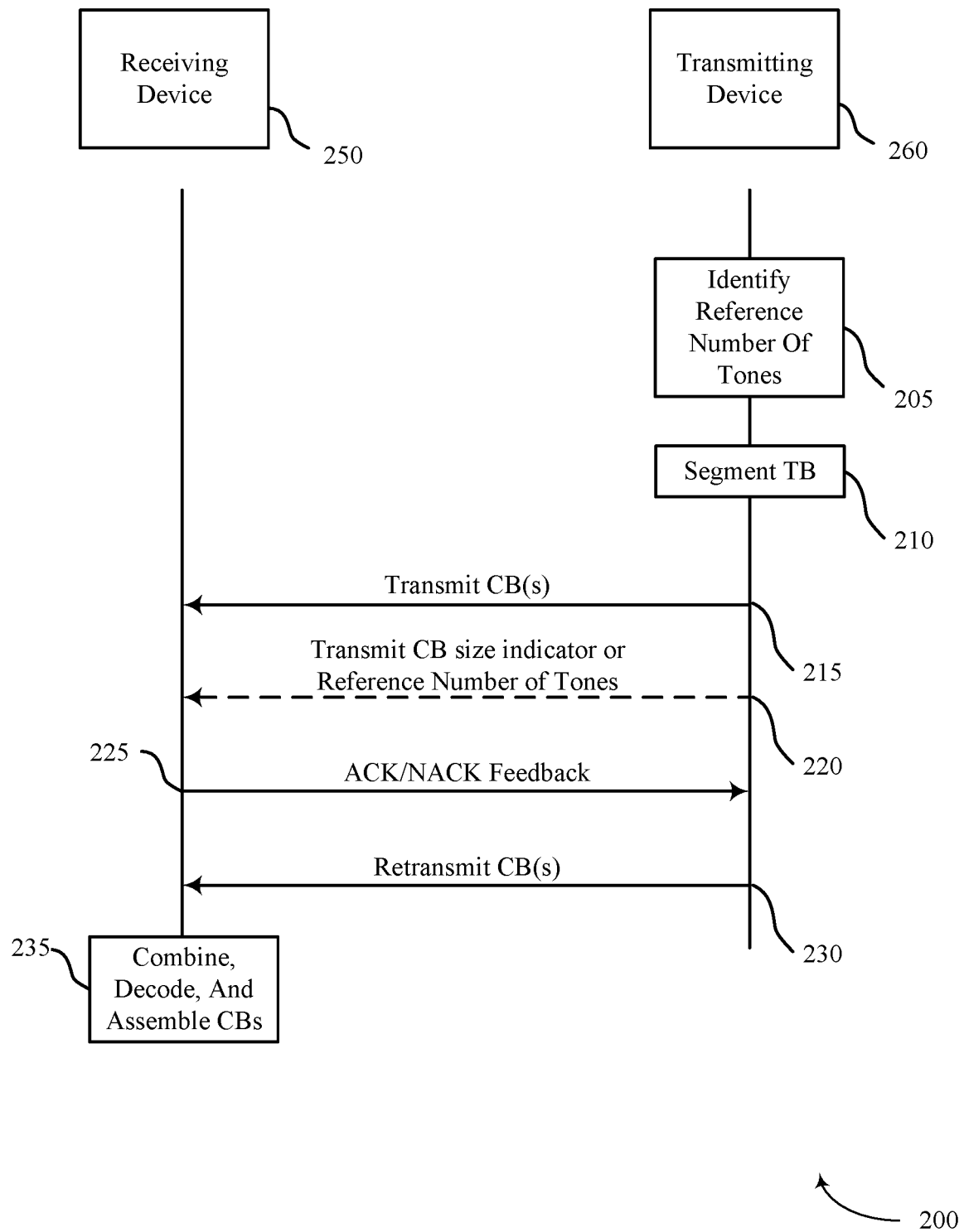
FIG. 2 illustrates an example of a process flow that supports TB segmentation and signaling for a wireless communication system in accordance with aspects of the present disclosure.

FIG. 2 illustrates an example process flow 200 that supports TB segmentation and signaling for a wireless communication system in accordance with various aspects of the present disclosure. The process flow may include a receiving device 250 and a transmitting device 260, which may be examples of UE 115 and base station 105 described with reference to FIG. 1, respectively. In other examples, the receiving device 250 and transmitting device 260 may be examples of base station 105 and UE 115 described with reference to FIG. 1, respectively.

A TB may be segmented into one or more CBs prior to transmission. For example, if the TB includes more information bits than the number of bits that a decoder is capable of decoding, the TB may be segmented into one or more smaller CBs. The one or more CBs may then be transmitted from the transmitting device 260 to the receiving device 250. Upon reception, the receiving device 250 may decode the one or more CBs by combining one or more CBs from an initial TB with one or more CBs from a retransmitted TB (e.g., in a HARQ process) or may decode the one or more CBs and assemble the decoded CBs to obtain the information transmitted in the TB. In some examples, a TB may include less than a minimum amount of information bits to be sent in an RB. In such cases, pad bits may be determined and added to the TB, as will be discussed further below. The TB may then be segmented into a single CB containing information bits from the TB along with the determined pad bits and transmitted from the transmitting device 260 to the receiving device 250.

To segment the TB into one or more CBs, the transmitting device 260 identifies a reference number of tones for an overhead channel at 205. An overhead channel may refer to one or more REs of an RB that may be allocated (e.g., allocated on a periodic or aperiodic basis) for data transmission in one subframe and other transmission in another subframe. For example, in a first subframe, a given RE may be allocated for data transmission. In a second subframe, the given RE (e.g., the RE having the same symbol and carrier assignment, but in a different subframe) may be allocated for discovery. In the a third subframe, the given RE may be allocated for discovery and control information. Accordingly, in certain examples, while there are subframes in which the given RE is allocated for data transmission, in some subframes, the given RE is allocated for transmission of information other than data. As such, the reference number of tones may be determined based on the number of potential overhead channels that could be allocated in a data region of the frame structure allocated for communication between transmitting device 260 and receiving device 250. In other words, a finite number of RBs may be allocated for communication between transmitting device 260 and receiving device 250. A portion of the allocated RBs may be assigned to control information and the remaining RBs may be assigned for data transmission. In some examples, a portion of the RBs allocated in the data region or one or more REs of one or more RBs allocated in the data region may be allocated for overhead channels, resulting in fewer REs and/or RBs available for data transmission.

In some examples, overhead channels may include a control channel (e.g., a Physical Uplink Shared Channel (PUSCH) in a data region or when a control channel is included in a data transmission for a UE or a group of UEs (e.g., multiple-user multiple-input multiple-output (MU-MIMO)). Overhead channels may include a discovery signal (e.g., a synchronization signal when one or more REs of an RB includes a synchronization or pilot signal), or a channel state indicator (e.g., a channel state information reference signal (CSI-RS) or a zero power CSI-RS, if used). In some examples, the overhead channels may be assigned to one or more REs of one or more RBs allocated for data transmission. Such signals may be periodically or aperiodically transmitted. As mentioned above, the reference number of tones may be determined based on the number of overhead channels that may be allocated in the data region. The reference number of tones may be based on the communication link direction, such as uplink, downlink, or sidelink. For example, the reference number of tones may vary depending on whether the communication is an uplink transmission, a downlink transmission, or a sidelink transmission. In other examples, the reference number of tones may be determined to be the same for one or more communication link directions. For example, the reference number of tones for an uplink transmission may be determined to be the same as the reference number of tones for a downlink transmission, but may differ from the reference number of tones determined for a sidelink communication.

In one example, if several types of overhead channels were scheduled to be transmitted in a given subframe, a relatively large number of the available REs in the data region may be allocated for overhead channels. If none of the overhead channels were scheduled to be transmitted in a given subframe, a relatively small number of the available REs in the data region may be allocated for overhead channels. In some examples, one or more of a maximum number, a minimum number, an average, or a median number of REs allocated for overhead channels may be determined and the reference number of tones identified in 205 may be based on the determined number of REs allocated for overhead channels. Other considerations may include shared channel (e.g., a physical downlink shared channel (PDSCH)) rate matches around tones that may be reserved for overhead channels, for example.

Using the reference number of tones identified in 205, the number of CBs for segmenting the TB may be determined and, in combination with the MCS, CB size, TB size, and/or allocated RBs, the TB may be segmented into one or more CBs at 210, as discussed further below. At 215, the one or more CBs may be transmitted from the transmitting device 260 to the receiving device 250. Optionally, at 220, the transmitting device 260 may transmit an indicator (e.g., a CB size indicator) or the reference number of tones identified at 205 to the receiving device 250. For example, the transmitting device 260 may transmit the CB size indicator or the reference number of tones identified at 205 in a control channel (e.g., a PDCCH). Using the CB size indicator and/or the reference number of tones, the receiving device 250 may decode the one or more CBs transmitted at 215. If the one or more CBs were successfully decoded at 215, the receiving device 250 may transmit an ACK feedback signal to the transmitting device 260 at 225 indicating that the transmission was successfully received and decoded. Alternatively, if the one or more CBs were not successfully decoded, the receiving device 250 may transmit a NACK feedback signal to the transmitting device 260 at 225 indicating that the transmission was not successful and retransmission of the TB is needed. Upon receipt of a NACK feedback signal, the transmitting device 260 may retransmit the one or more CBs of the TB at 230. After retransmission of the one or more CBs of the TB at 230, the receiving device 250 may combine the transmitted CBs at 215 with the CBs retransmitted at 230 in a HARQ process, the receiving device 250 may decode the one or more CBs retransmitted at 230 in an ARQ process, or the receiving device 250 may decode each of the one or more CBs and assemble the TB based on the decoded one or more CBs at 235.

Figure 3A:
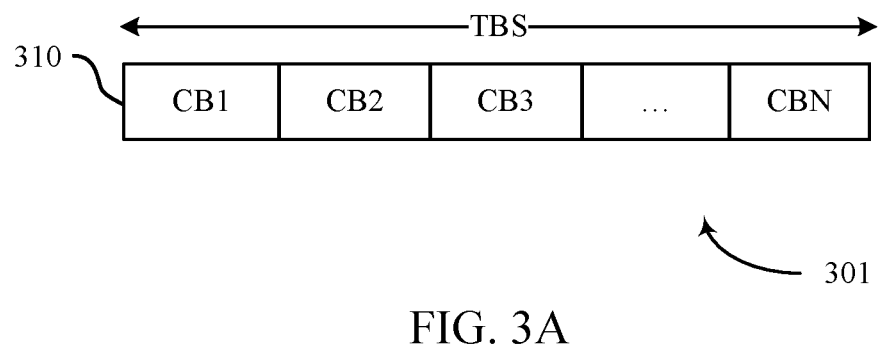
FIGS. 3A and 3B illustrate examples of TB segmentation and signaling in accordance with aspects of the present disclosure.
Figure 3B:
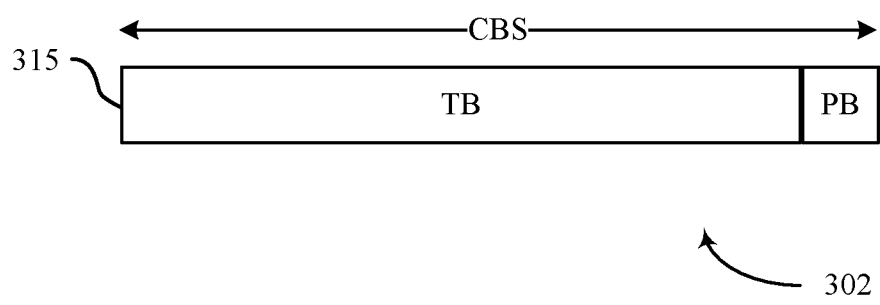

FIGS. 3A and 3B illustrate an example 301 and an example 302 of TB segmentation in accordance with aspects of the present disclosure. In FIG. 3A, TB 310 is shown segmented into one or more CBs (CB1, CB2, . . . , CBN). The number of CBs and the CB size may be based on the TB size (TBS), the MCS, and the number of RBs available. The one or more CBs may include one or more parity bits (not shown) determined based on an error detection system (e.g., Cyclic Redundancy Check (CRC)).

In FIG. 3B, the TBS may be less than a minimum size for transmission. In this example, a CB 315 may include the TB along with a pad bit (PB) and the CB size (CBS) may be determined based on the TB and one or more PBs.

Figure 4:
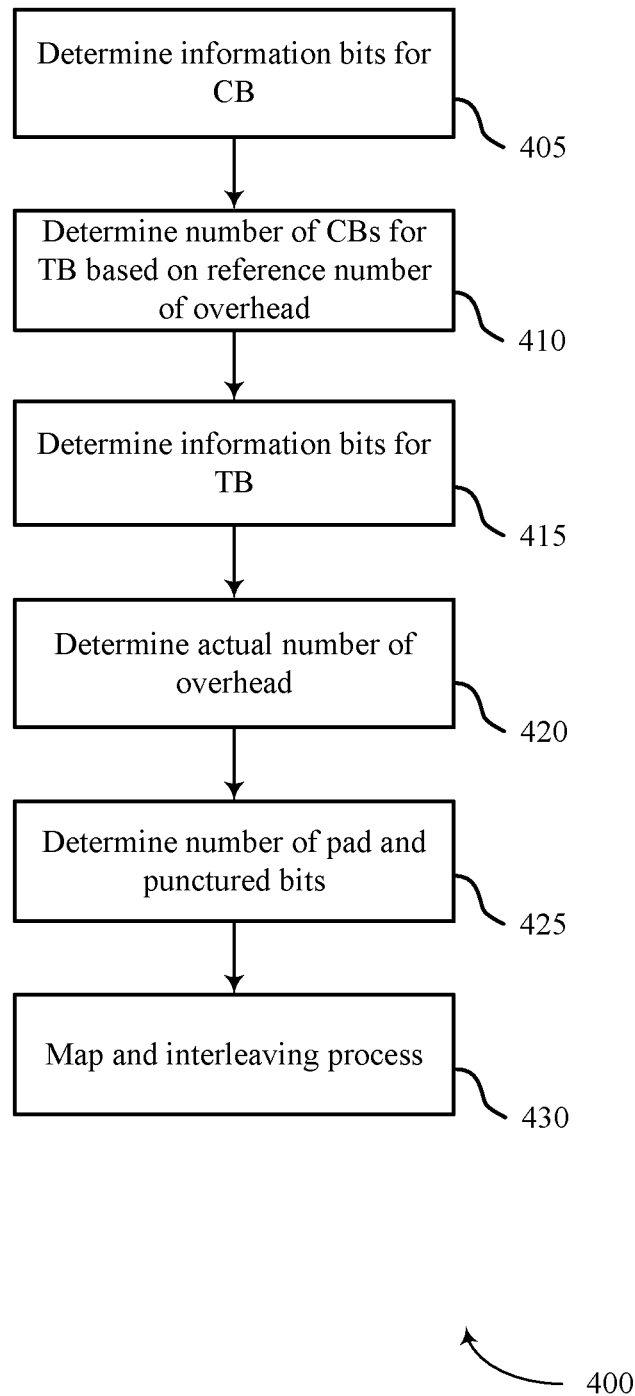
FIG. 4 illustrates a flow chart of a method for wireless communication that supports TB segmentation and signaling in accordance with aspects of the present disclosure.

FIG. 4 shows a flow chart illustrating a method 400 for wireless communication that supports TB segmentation and signaling in accordance with aspects of the present disclosure. The method 400 may be utilized to determine segmentation of a TB into one or more CBs to be transmitting from a transmitting device to a receiving device, such as transmitting device 260 and receiving device 250, as shown in FIG. 2. At 405, a number of information bits per CB is determined. The number of information bits per CB may be determined based on the MCS and the CB size. For example, the MCS may indicate a code rate of ½, ¾, ⅚, ⅞, or another code rate, which may be used to determine the CB size. The CB size may be based on a multiple of a predetermined number of bits (e.g., 648 bits, 1296 bits, 1944 bits, etc.). Alternatively, the CB size may be based on the MCS. In other examples, the CB size may be determined based at least in part on a minimum allowable block size, which may depend on the wireless communications system, the MCS, or hardware limitations of a device in a wireless communications system, among others. For example, a decoder in an LTE/LTE-A communications system may have a minimum CB size of 40 bits. In other examples, the CB size may be determined based at least in part on a maximum allowable block size. For example, a decoder in an LTE/LTE-A communications system may have a maximum CB size of 6144 bits.

At 410, a number of CBs for the TB is determined. The number of CBs may be based on the number of physical bits, which may be calculated from the number of RBs allocated for transmission between a transmitting device and a receiving device. The number of physical bits may also depend on the MCS. For example, if the MCS indicates a modulation order of 2 in an OFDM scheme (e.g., indicating 12 subcarriers, 7 OFDM symbols, and 2 slots per subframe) and 2 RBs are allocated for transmission, 672 bits may be determined as the number of physical bits available for transmission. Some of the 672 bits may be allocated for control channels and in such instances, only a portion of the 672 bits may be available for other transmissions. The number of CBs may also be based upon a reference number of tones for overhead channels (e.g., control channels), as discussed above. Based on the MCS and the reference number of tones for overhead channels, a reference number of overhead bits may be determined. Using the number of physical bits, the reference number of overhead bits, and the CB size (e.g., one of 648 or 1296, or based on the MCS), the number of CBs for segmentation of the TB may be determined based on Equation 1 below.

$$N_{CB_{TB}} = \text{ceiling}\left(\frac{N_{phy_{bits}} - N_{ref_{bits}}}{CBS}\right) \quad \text{Equation 1}$$

In Equation 1, $N_{CB_{TB}}$ is the number of CBs for segmentation of the TB, $N_{phy_{bits}}$ is the number of physical bits allocated for transmission (excluding the number of bits allocated for control channels), $N_{ref_{bits}}$ is the reference number of overhead bits based on the reference number of tones for overhead channels, and CBS is the CB size. Here, the ceiling function is a function to round up to the nearest integer.

Once the number of CBs for the TB is determined at 410, using the number of information bits per CB from 405, the number of information bits for the TB may be determined at 415 by multiplying the number of information bits per CB and the number of CBs for segmentation of the TB. At this point, the determined number of CBs for the TB and the number of information bits for the TB determined at 415 are based on a reference number of overhead bits and are therefore independent of the actual number of overhead bits used in a given subframe.

At 420, the actual number of overhead bits is determined. In some examples, because the actual number of overhead channels may differ between two subframes, the actual number of overhead bits is determined based on the number of overhead channels using one or more REs of one or more RBs allocated for data transmission in a current subframe.

Based on the actual number of overhead bits and the number of CBs for the TB based on the reference number of overhead bits determined at 410, a number of pad bits or a number of puncture bits may be determined at 425. To determine the number of puncture bits ($N_{pun\_bits}$) for the current subframe, the actual number of overhead bits used in the current subframe may be subtracted from the number of physical bits allocated for data transmission in the current subframe. Based on the number of CBs for the TB determined in 410 and the number of puncture bits, the number of puncture bits per CB may be determined based on Equation 2 below.

$$N_{pun\_CB} = \text{ceiling}\left(\frac{N_{pun\_bits}}{N_{CB_{TB}}}\right) \quad \text{Equation 2}$$

In Equation 2, $N_{pun\_CB}$ is the number of puncture bits per CB, $N_{pun\_bits}$ is the number of puncture bits determined above, and $N_{CB_{TB}}$ is the number of CBs for segmentation of the TB determined at 410. Here, the ceiling function is a function to round up to the nearest integer.

Once the number of puncture bits per CB is determined, the number of pad bits ($N_{pad\_bits}$) for the TB may be determined based on Equation 3 below.

$$N_{pad\_bits} = N_{pun\_CB} \times N_{CB_{TB}} - N_{pun\_bits} \quad \text{Equation 3}$$

In Equation 3, $N_{pad\_bits}$ is the number of pad bits for the TB, $N_{pun\_CB}$ is the number of puncture bits per CB, $N_{pun\_bits}$ is the number of puncture bits determined above with reference to Equation 2, and $N_{CB_{TB}}$ is the number of CBs for segmentation of the TB determined at 410. Here, the number of pad bits and puncture bits may be determined based on the actual overhead channels used in the current subframe.

Using the method 400, CBs may be punctured based on the number of puncture bits or padded based on the number of pad bits determined above. After accounting for the actual overhead channels in the current subframe, the CBs may then be mapped to symbols in one or more RBs and an interleaving process (e.g., an interleaver at the RB level for each symbol) may be performed prior to transmission of the CBs at 430.

After the one or more CBs have been mapped to tones in one or more RBs, an interleaver process may be performed for each symbol. In some examples, a row-column (RC) interleaver process may be used to interleave the tones associated with the more CBs to resources within each symbol. Bits may be interleaved based on possible overhead tones that exist in a given symbol or the reference number of tones for an overhead channel. For example, the tones associated with the one or more CBs may be interleaved around possible overhead tones such that only the tones associated with the one or more CBs are interleaved and the overhead tones are not interleaved. In some examples, the interleaving process may be performed prior to mapping the tones associated with the one or more CBs to available RBs and may be based at least in part on the available resources, the MCS, and the number of overhead tones, among other factors. In various examples, the bits for some CBs may have a different symbol location in the initial transmission when compared to retransmission.

Interleaving

Figure 5A:
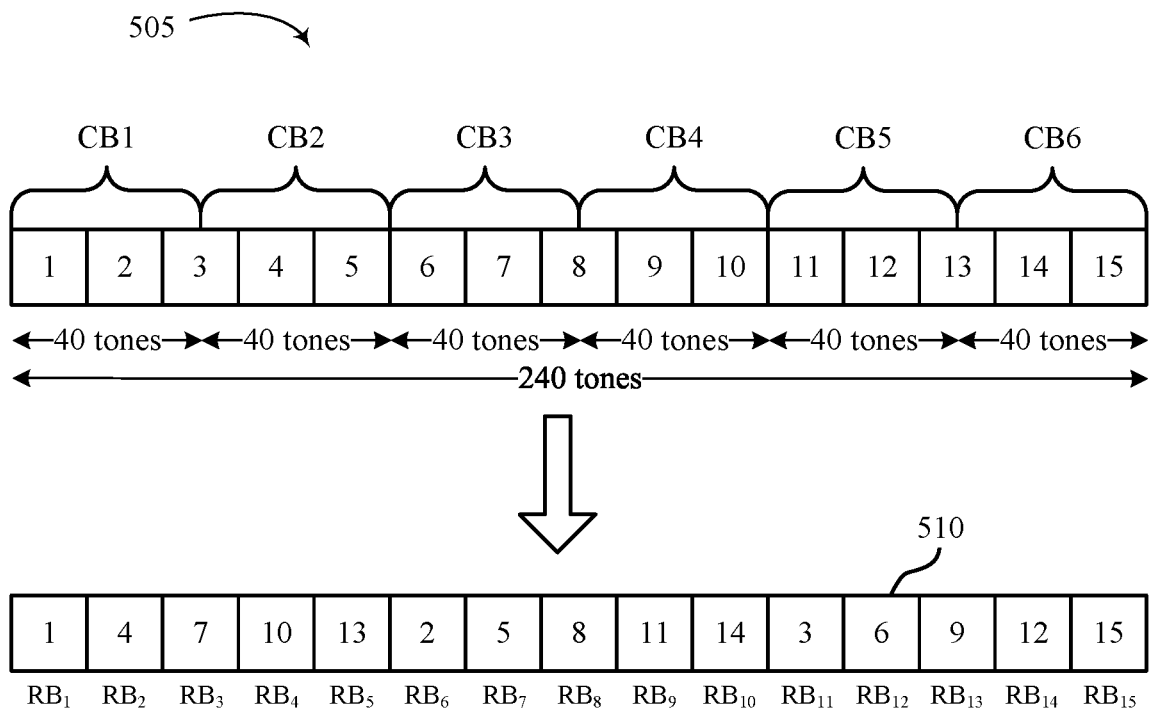
FIGS. 5A and 5B illustrate an interleaving process in accordance with aspects of the present disclosure.
Figure 5B:
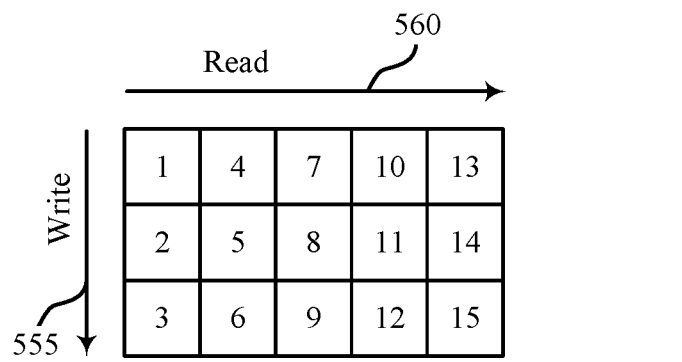

FIGS. 5A and 5B illustrate an example interleaver process 500 in accordance with various aspects of the present disclosure. In FIG. 5A, a TB 505 may be segmented into one or more CBs (e.g., CB1, CB2, CB3, CB4, CB5, and CB6). The TB 505 may be segmented using one or more segmentation methods of the present disclosure, or may be segmented into one or more CBs using any other technique. As shown in FIG. 5A, each of CB1, CB2, CB3, CB4, CB5, and CB6 spans 40 tones of a TB 505 having a total of 240 allocated tones. As would be understood, any number of CBs may be used to segment the TB 505 and any number of tones may also be considered without departing from the scope of the present disclosure.

In a k-tone row-column (RC) interleaver process, each k-sized bundle of tones may be written to available resources in columns, but may be read in rows and vice versa. Here, k refers to the number of tones in a bundle where one or more bundles span a symbol of one or more RBs. In the interleaver process 500 of FIG. 5A, a 16-tone RC interleaver process is shown. In this example, 16 tones make up a tone bundle and one tone bundle spans a symbol of a single RB. To perform the interleaver process, tones of the CB1, CB2, CB3, CB4, CB5, and CB6 may be mapped to one or more RBs by calculating a number of rows and columns for an interleaver matrix 550, as shown in FIG. 5B. The tones may then be written to elements of the interleaver matrix 550 in a first order (e.g., first along the columns and then along the rows) and interleaved by reading the written elements from the interleaver matrix 550 in a second, different order (e.g., first along the rows and then along the columns). To determine the interleaver matrix 550, the number of rows ($N_{rows}$) for the interleaver matrix 550 may be calculated using a ceiling function as follows:

$$N_{rows} = \left\lceil \frac{N - N_{pun\_CB}}{N_{Layers} * N_{QAM} * k} \right\rceil \quad \text{Equation 4}$$

In Equation 4, N is the number of encoded bits (e.g., the bits to be mapped) per CB, $N_{pun\_cB}$ is the number of puncture bits per CB (which may be calculated as discussed above), $N_{Layers}$ is the number of layers according to the modulation and coding scheme, $N_{QAM}$ is the modulation order according to the MCS, and k is the number of tones in each bundle. Using the calculated number of rows for interleaver matrix 550, the number of columns ($N_{cols}$) may be calculated using ceiling functions as follows:

$$N_{cols} = \left\lceil \frac{\left\lceil \frac{N_{tones\_avail}}{k} \right\rceil}{N_{rows}} \right\rceil \quad \text{Equation 5}$$

In Equation 5, $N_{tones\_avail}$ is the number of available tones in a symbol for mapping bits of the one or more CBs, $N_{rows}$ is the number of rows calculated from Equation 4, and k is the number of tones in each bundle.

Once the number of rows and columns are calculated from Equations 4 and 5, respectively, the tones of the one or more CBs may be written in interleaver matrix 550 as shown in FIG. 5B. In this example, the number of columns (calculated to be 5 using Equation 5) and the number of rows (calculated to be 3 using Equation 4) make up the interleaver matrix 550 shown in FIG. 5B. The tones of each of CB1, CB2, CB3, CB4, CB5, and CB6 may be written in elements in a column direction 555, as shown. When reading the written elements in a different direction, such as reading in row direction 560, the tones of the one or more CBs may be interleaved between one another. For example, as shown in FIGS. 5A and 5B, the tones of TB 505 are written in the column direction 555 and read in the row direction 560 and the interleaved CBs may be mapped to RBs 510 ($RB_1$, $RB_2$, . . . , $RB_{15}$) in the order in which the tones were read from interleaver matrix 550. As the tones of the one or more CBs were written in a column direction 555 and read in a row direction 560, the resulting interleaved CBs may be mapped to the available RBs ($RB_1$, $RB_2$, . . . , $RB_{15}$) as represented by RBs 510 of FIG. 5A.

While the tones of the one or more CBs may be written in a column direction 555 and read in a row direction 560 as illustrated in FIG. 5B, the tones may be written in a row direction and read in a column direction. In other examples, the tones may be written in any predetermined order and read in any predetermined order, which may be different from the order in which the tones were written.

In some examples, after the one or more tones of the CBs are interleaved and mapped to available resources, the mapped CBs may then be transmitted from a transmitting device (e.g., transmitting device 260 in FIG. 2) to a receiving device (e.g., receiving device 250 in FIG. 2). Once received by the receiving device, the receiving device may perform a deinterleaving process (e.g., a reverse of the interleaving process) in order to decode the one or more CBs.

Figure 6A:
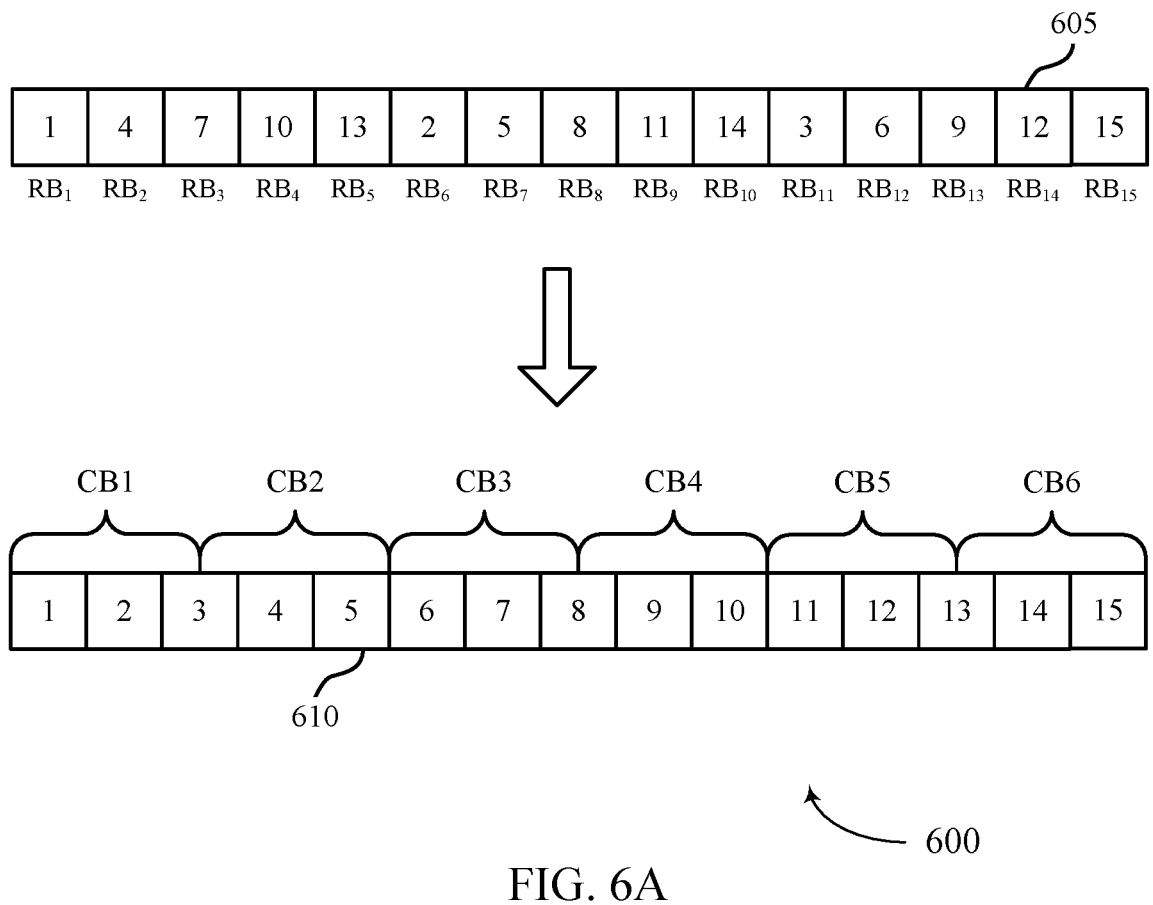
FIGS. 6A and 6B illustrate a deinterleaving process in accordance with aspects of the present disclosure.
Figure 6B:
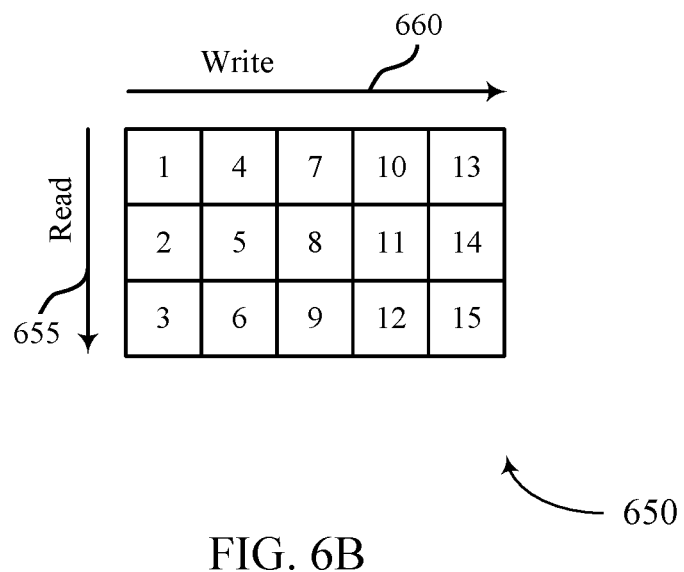

FIGS. 6A and 6B illustrate an example deinterleaving process 600 in accordance with various aspects of the present disclosure. After one or more CBs 605 that have been interleaved and mapped are received by a receiving device (e.g., receiving device 250 in FIG. 2), a deinterleaving process may be performed to obtain and decode the one or more CBs of the TB. By calculating the number of rows and columns using Equations 4 and 5 above, the received tones of the CBs 605 may be written into elements of a deinterleaver matrix 650, as shown in FIG. 6B. In some examples, the rows and columns of the deinterleaver matrix 650 may be calculated based on a CB size indicator. For example, the CB size indicator may be predetermined or may be transmitted from a transmitting device to a receiving device and the received tones of the CBs 605 may be written into elements of a deinterleaver matrix 650 based on the CB size indicator. According to the deinterleaver matrix 650, the received tones of the CBs 605 may be written in elements of the deinterleaver matrix 650. In some examples, the tones may be written to elements of the deinterleaver matrix 650 in a first order (e.g., first along the rows and then along the columns). The received tones of the CBs 605 may then be deinterleaved by reading the written elements from the deinterleaver matrix 650 in a second, different order (e.g., first along the columns and then along the rows). The tones may then be ordered as read in the column direction 660 to obtain a TB 610 with the one or more CBs CB1, CB2, CB3, CB4, CB5, and CB6. Based on the deinterleaved CBs, the data transmitted in the TB 610 may be decoded.

While the tones of the one or more CBs may be written in a column direction 660 and read in a row direction 655 as illustrated in FIG. 6B, in other examples the tones may be written in a column direction and read in a row direction. In other examples, the tones may be written in any predetermined order and read in any predetermined order, which may be different from the order in which the tones were written.

Figure 7:
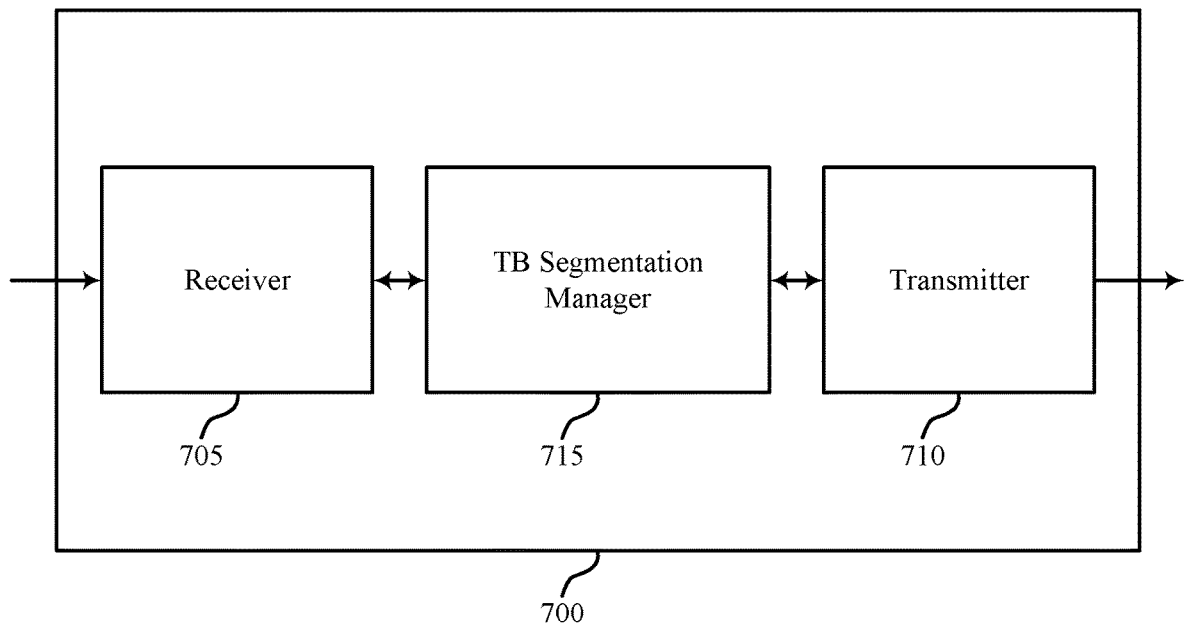
FIGS. 7 through 9 show block diagrams of a wireless device that supports TB segmentation and signaling in accordance with aspects of the present disclosure.

FIG. 7 shows a block diagram of a wireless device 700 that supports TB segmentation and signaling in accordance with various aspects of the present disclosure. Wireless device 700 may be an example of aspects of a UE 115 or base station 105 described with reference to FIGS. 1 and 2, including receiving device 250 and transmitting device 260 described with reference to FIG. 2. Wireless device 700 may include receiver 705, transmitter 710 and TB segmentation manager 715. Wireless device 700 may also include a processor and memory. Each of these components may be in communication with each other.

The receiver 705 may receive information such as packets, user data, or control information associated with various information channels (e.g., control channels, data channels, and information related to TB segmentation and signaling, etc.). Information may be passed on to other components of the device. The receiver 705 may be an example of aspects of the transceiver 1025 described with reference to FIG. 10.

The transmitter 710 may transmit signals received from other components of wireless device 700. In some examples, the transmitter 710 may be collocated with a receiver in a transceiver module. For example, the transmitter 710 may be an example of aspects of the transceiver 1025 described with reference to FIG. 10. The transmitter 710 may include a single antenna, or may include a plurality of antennas.

The TB segmentation manager 715 may receive a CB size indicator associated with a CB of a TB, decode the CB based at least in part on the CB size indicator, assemble the TB based at least in part on the decoded CB, identify a reference number of tones for an overhead channel of a TB, and segment the TB into a CB based at least in part on the reference number of tones for the overhead channel. The TB segmentation manager 715 may also be an example of aspects of the TB segmentation manager 1005 described with reference to FIG. 10.

Figure 8:
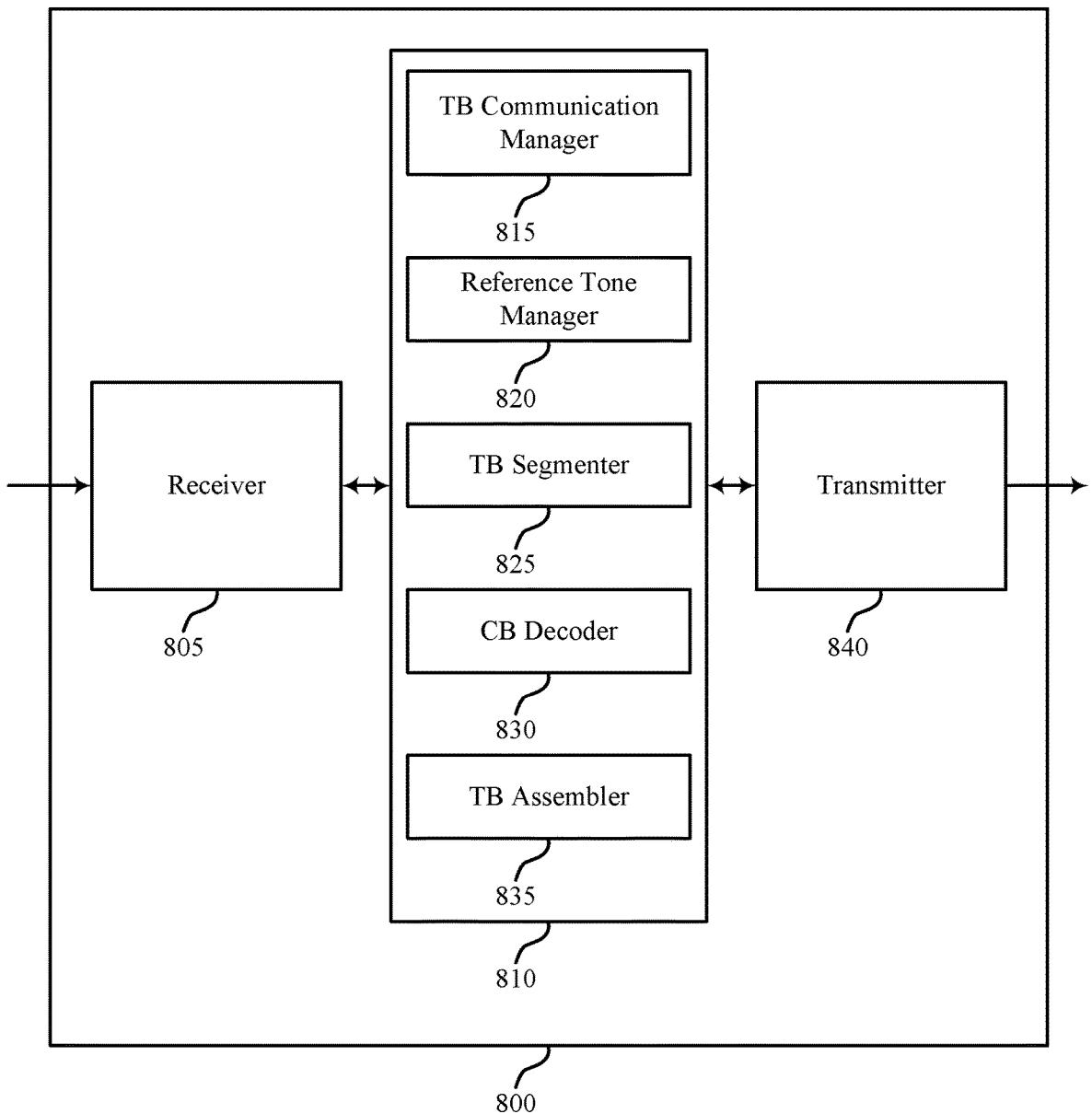

FIG. 8 shows a block diagram of a wireless device 800 that supports TB segmentation and signaling in accordance with various aspects of the present disclosure. Wireless device 800 may be an example of aspects of a wireless device 700 or a UE 115 or base station 105 described with reference to FIGS. 1, 2, and 7, including receiving device 250 and transmitting device 260 described with reference to FIG. 2. Wireless device 800 may include receiver 805, TB segmentation manager 810 and transmitter 840. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10.

The TB segmentation manager 810 may be an example of aspects of TB segmentation manager 715 described with reference to FIG. 7. The TB segmentation manager 810 may include TB communication manager 815, reference tone manager 820, TB segmenter 825, CB decoder 830, and TB assembler 835. The TB segmentation manager 810 may be an example of aspects of the TB segmentation manager 1005 described with reference to FIG. 10.

The TB communication manager 815 may receive a CB size indicator associated with a CB of a TB, receive the CB size indicator using a control channel, and receive the reference number of tones using a control channel. In some cases, the CB size indicator is based at least in part on a reference number of tones associated with an overhead channel of the TB. In some cases, the reference number of tones is based at least in part on one or more of a control channel in a data region of the TB, a synchronization channel, or a CSI-RS. In some cases, the reference number of tones is based at least in part on one or more of a maximum number of tones, a minimum number of tones, or a median number of tones associated with the overhead channel. In some cases, the CB size indicator is based at least in part on an actual number of tones for an overhead channel associated with the TB.

The reference tone manager 820 may identify a reference number of tones for an overhead channel of a TB. In some cases, the reference number of tones for the overhead channel is based at least in part on one or more of a control channel in a data region of the TB, a synchronization channel, or a CSI-RS. In some cases, the reference number of tones for the overhead channel is based at least in part on one or more of a maximum number of tones, a minimum number of tones, or a median number of tones associated with the overhead channel. In some examples, the reference number of tones may be based at least in part on a communication link direction, which may be uplink, downlink, or sidelink.

The TB segmenter 825 may segment the TB into a CB based at least in part on the reference number of tones for the overhead channel, and transmit, on a control channel, a CB size indicator or the reference number of tones.

The CB decoder 830 may decode the CB based at least in part on the CB size indicator.

The TB assembler 835 may assemble the TB based at least in part on the decoded CB.

The transmitter 840 may transmit signals received from other components of wireless device 800. In some examples, the transmitter 840 may be collocated with a receiver in a transceiver module. For example, the transmitter 840 may be an example of aspects of the transceiver 1025 described with reference to FIG. 10. The transmitter 840 may utilize a single antenna, or may utilize a plurality of antennas.

Figure 9:
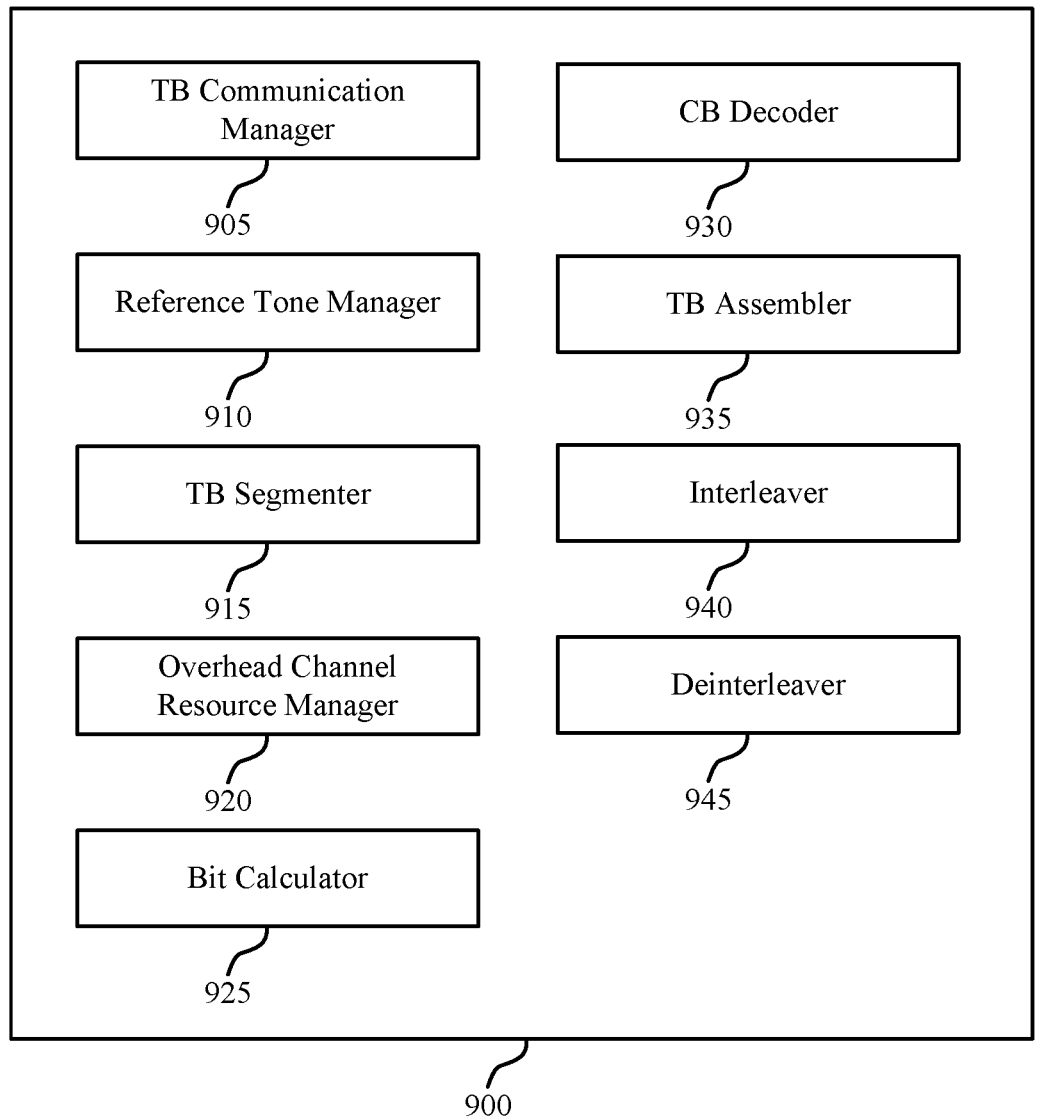

FIG. 9 shows a block diagram of a TB segmentation manager 900 which may be an example of the corresponding component of wireless device 700 or wireless device 800. That is, TB segmentation manager 900 may be an example of aspects of TB segmentation manager 715 or TB segmentation manager 810 described with reference to FIGS. 7 and 8. The TB segmentation manager 900 may also be an example of aspects of the TB segmentation manager 1005 described with reference to FIG. 10.

The TB segmentation manager 900 may include TB communication manager 905, reference tone manager 910, TB segmenter 915, overhead channel resource manager 920, bit calculator 925, CB decoder 930, TB assembler 935, an interleaver 940, and a deinterleaver 945. Each of these modules may communicate, directly or indirectly, with one another (e.g., via one or more buses).

The TB communication manager 905 may receive a CB size indicator associated with a CB of a TB, receive the CB size indicator using a control channel, and receive the reference number of tones using a control channel. In some cases, the CB size indicator is based at least in part on a reference number of tones associated with an overhead channel of the TB. In some cases, the reference number of tones is based at least in part on one or more of a control channel in a data region of the TB, a synchronization channel, or a CSI-RS. In some cases, the reference number of tones is based at least in part on one or more of a maximum number of tones, a minimum number of tones, or a median number of tones associated with the overhead channel. In some cases, the CB size indicator is based at least in part on an actual number of tones for an overhead channel associated with the TB.

The reference tone manager 910 may identify a reference number of tones for an overhead channel of a TB. In some cases, the reference number of tones for the overhead channel is based at least in part on one or more of a control channel in a data region of the TB, a synchronization channel, or a CSI-RS. In some cases, the reference number of tones for the overhead channel is based at least in part on one or more of a maximum number of tones, a minimum number of tones, or a median number of tones associated with the overhead channel. In some examples, the reference number of tones may be based at least in part on a communication link direction, which may be uplink, downlink, or sidelink.

The TB segmenter 915 may segment the TB into a CB based at least in part on the reference number of tones for the overhead channel, and transmit, on a control channel, a CB size indicator or the reference number of tones.

The overhead channel resource manager 920 may determine an actual number of tones associated with the overhead channel, wherein segmenting the TB into the CB is further based at least in part on the actual number of tones.

The bit calculator 925 may determine a number of information bits for the TB based at least in part on a number of CBs associated with the TB and a number of information bits for the CBs, determine the number of information bits for the CBs based at least in part on a CB size and a code rate, determine the number of CBs associated with the TB based at least in part on a number of RBs allocated for the TB and the reference number of tones for the overhead channel, determine a number of pad bits for the TB based at least in part on an actual number of tones associated with the overhead channel, and determine a number of punctured bits for the CB based at least in part on an actual number of tones associated with the overhead channel.

The CB decoder 930 may decode the CB based at least in part on the CB size indicator.

The TB assembler 935 may assemble the TB based at least in part on the decoded CB.

The interleaver 940 may interleave tones of one or more CBs and may perform an interleaving process, such as the interleaving process described with reference to FIGS. 5A and 5B. The interleaving process may be performed for each symbol. In some examples, an RC interleaver process may be used to interleave the tones associated with one or more CBs to resources within a symbol. Bits may be interleaved based on possible overhead tones that exist in a given symbol or the reference number of tones for an overhead channel. For example, the tones associated with the one or more CBs may be interleaved around possible overhead tones such that only the tones associated with the one or more CBs are interleaved and the overhead tones are not interleaved. In some examples, the interleaving process may be performed prior to mapping the tones associated with the one or more CBs to available RBs and may be based at least in part on the available resources, the MCS, and the number of overhead tones, among other factors. In various examples, the bits for some CBs may have a different symbol location in the initial transmission when compared to retransmission. In some examples, the interleaver 940 may determine an interleaver matrix based at least in part on a tone bundle size and a CB size associated with the plurality of CBs. The interleaver 940 may interleave the plurality of CBs according to the interleaver matrix.

The deinterleaver 945 may deinterleave tones of one or more CBs and may perform a deinterleaving process, such as the deinterleaving process described with reference to FIGS. 6A and 6B. The deinterleaver process may be performed to obtain and decode one or more CBs of a TB. In some examples, a deinterleaver matrix 650 (e.g., as shown in FIG. 6B) may be calculated based on a CB size indicator. The deinterleaver may deinterleave the tones of one or more CBs according to the deinterleaver matrix.

Figure 10:
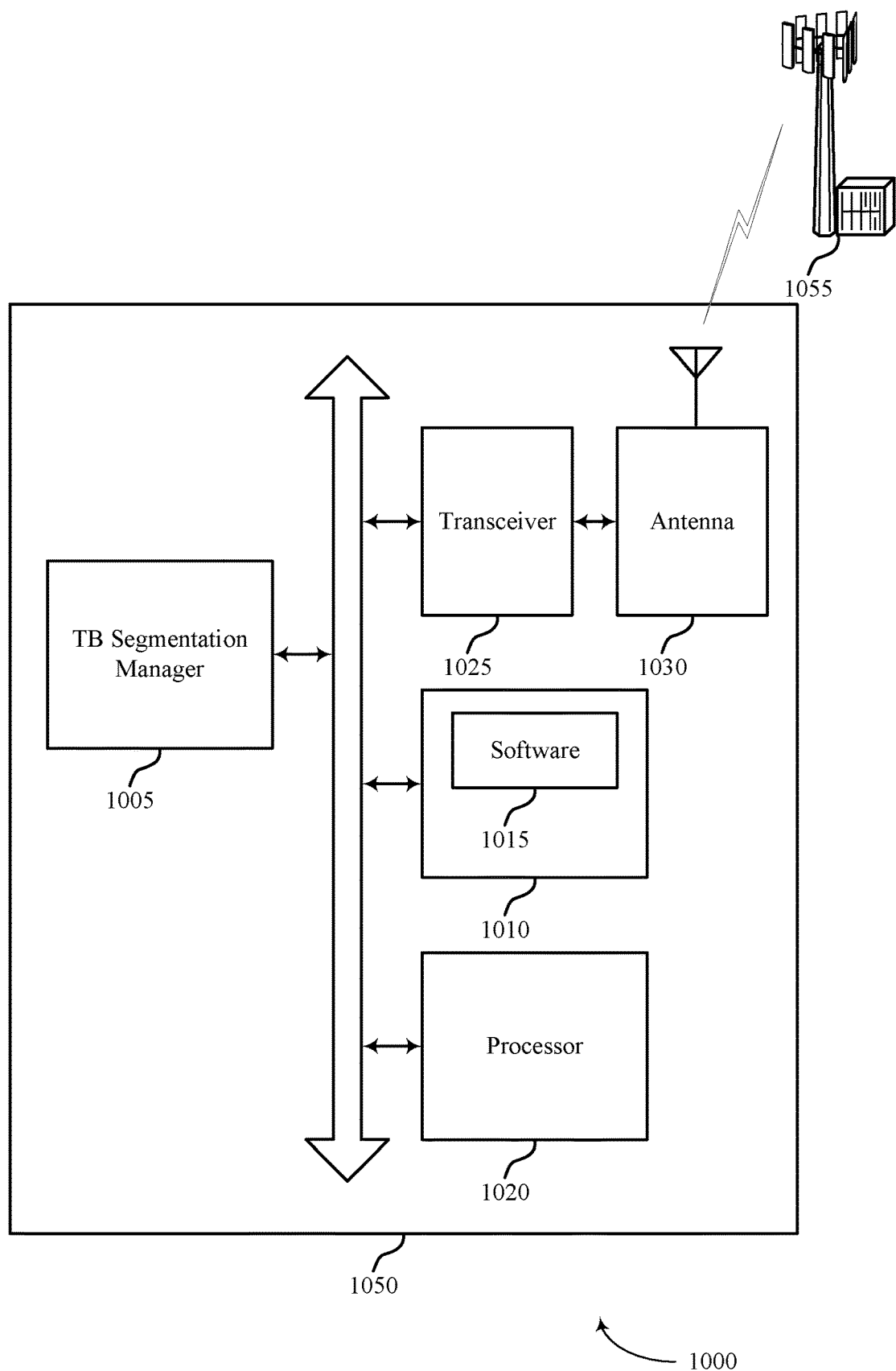
FIG. 10 illustrates a block diagram of a system including a UE that supports TB segmentation and signaling in accordance with aspects of the present disclosure.

FIG. 10 shows a diagram of a system 1000 including a device that supports TB segmentation and signaling in accordance with various aspects of the present disclosure. For example, system 1000 may include device 1050, which may be an example of a wireless device 700, a wireless device 800, a UE 115, or a base station 105 as described with reference to FIGS. 1, 2, (including receiving device 250 and transmitting device 260 described with reference to FIGS. 2), and 7 through 9.

As shown, device 1050 may also include TB segmentation manager 1005, memory 1010, processor 1020, transceiver 1025, antenna 1030 and additional module 1035. Each of these modules may communicate, directly or indirectly, with one another (e.g., via one or more buses).

The TB segmentation manager 1005 may be an example of a TB segmentation manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., TB segmentation and signaling, etc.).

In some cases, the software 1015 may not be directly executable by the processor but may cause a computer (e.g., when compiled and executed) to perform functions described herein.

The processor 1020 may include an intelligent hardware device, (e.g., a central processing unit (CPU), a microcontroller, an application specific integrated circuit (ASIC), etc.)

The transceiver 1025 may communicate bi-directionally, via one or more antennas, wired, or wireless links, with one or more networks, as described above. For example, the transceiver 1025 may communicate bi-directionally with a device 1055, which may be an example of a UE 115 or a base station 105 as described with reference to FIG. 1. The transceiver 1025 may also include a modem to modulate the packets and provide the modulated packets to the antennas for transmission, and to demodulate packets received from the antennas.

In some cases, the wireless device may include a single antenna 1030. However, in some cases the device may have more than one antenna 1030, which may be capable of concurrently transmitting or receiving multiple wireless transmissions.

Figure 11:
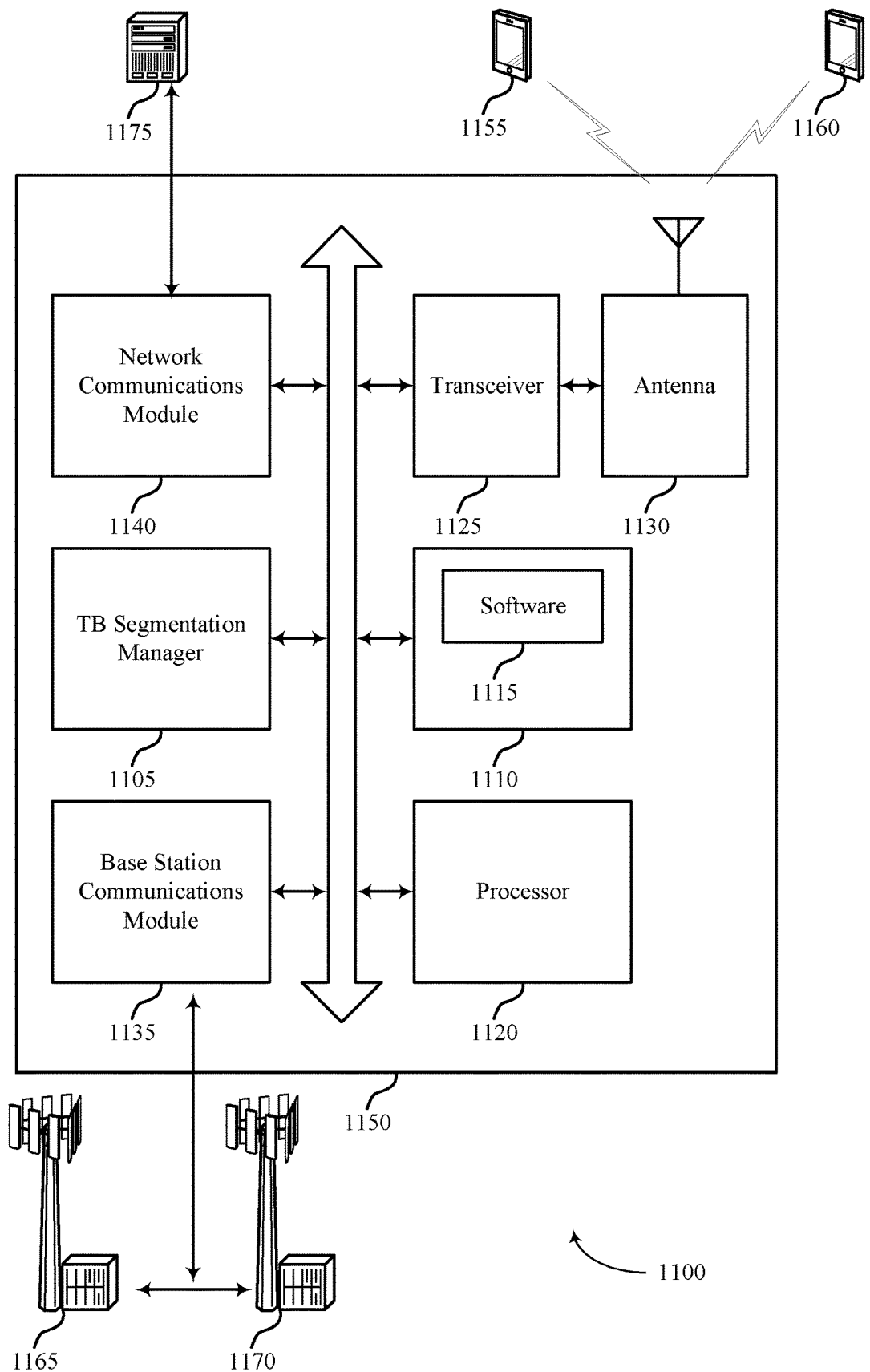
FIG. 11 illustrates a block diagram of a system including a base station that supports TB segmentation and signaling in accordance with aspects of the present disclosure.

FIG. 11 shows a diagram of a wireless system 1100 including a device 1150 that supports TB segmentation and signaling in accordance with various aspects of the present disclosure. For example, wireless system 1100 may include device 1150, which may be an example of a wireless device 700, a wireless device 800, a TB segmentation manager 900, a UE 115 or a base station 105 as described with reference to FIGS. 1, 2 (including receiving device 250 and transmitting device 260 described with reference to FIGS. 2), and 7 through 9. Device 1150 may also include components for bi-directional voice and data communications including components for transmitting communications and components for receiving communications. For example, device 1150 may communicate bi-directionally with one or more of UE 1155 or UE 1160, which may be examples of aspects of a UE 115 as described with reference to FIG. 1.

Device 1150 may also include TB segmentation manager 1105, memory 1110, processor 1120, transceiver 1125, antenna 1130, base station communications module 1135 and network communications module 1140. Each of these modules may communicate, directly or indirectly, with one another (e.g., via one or more buses).

The TB segmentation manager 1105 may be an example of a TB segmentation manager as described with reference to FIGS. 7 through 9.

The memory 1110 may include RAM and ROM. The memory 1110 may store computer-readable, computer-executable software including instructions that, when executed, cause the processor to perform various functions described herein (e.g., TB segmentation and signaling, etc.).

In some cases, the software 1115 may not be directly executable by the processor but may cause a computer (e.g., when compiled and executed) to perform functions described herein.

The processor 1120 may include an intelligent hardware device, (e.g., a CPU, a microcontroller, an ASIC, etc.)

The transceiver 1125 may communicate bi-directionally, via one or more antennas, wired, or wireless links, with one or more networks, as described above. For example, the transceiver 1125 may communicate bi-directionally with UE 1155 or UE 1160. The transceiver 1125 may also include a modem to modulate the packets and provide the modulated packets to the antennas for transmission, and to demodulate packets received from the antennas.

In some cases, the wireless device may include a single antenna 1130. However, in some cases the device may have more than one antenna 1130, which may be capable of concurrently transmitting or receiving multiple wireless transmissions.

The base station communications module 1135 may manage communications with base station 1165 and/or base station 1170, which may examples of aspects of base stations 105 described with reference to FIG. 1, and may include a controller or scheduler for controlling communications with UE 1155 and UE 1160 in cooperation with base station 1165 and/or base station 1170. For example, the base station communications module 1135 may coordinate scheduling for transmissions to UE 1155 and UE 1160 for various interference mitigation techniques such as beamforming or joint transmission. In some examples, base station communications module 1135 may provide an X2 interface within an LTE/LTE-A wireless communication network technology to provide communication between base station 1165 and base station 1170.

The network communications module 1140 may manage communications with the core network 1175 (e.g., via one or more wired backhaul links), which may be an examples of aspects of core network 130 as described with reference to FIG. 1. For example, the network communications module 1140 may manage the transfer of data communications for client devices, such as one or more of UE 1155 or UE 1160.

Figure 12:
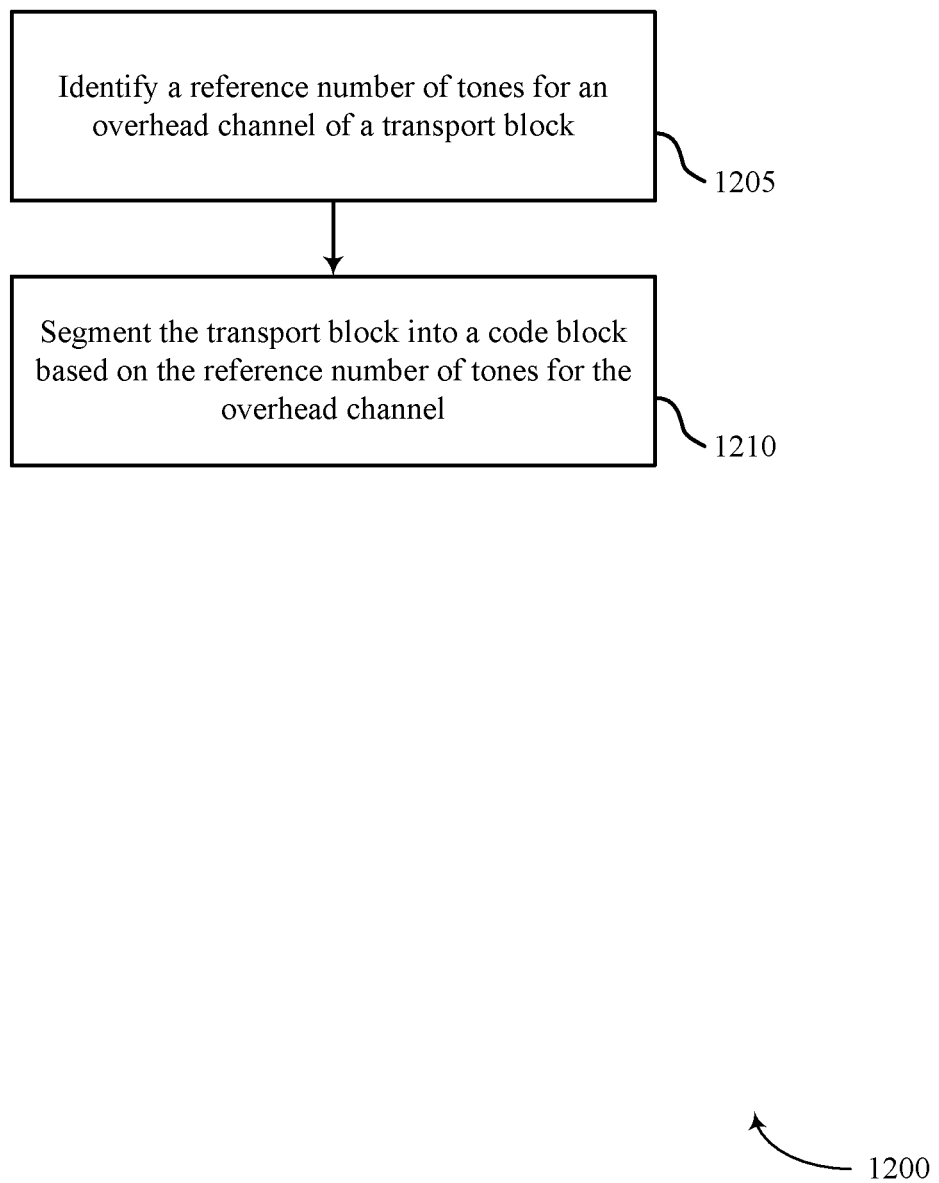
FIGS. 12 through 15 illustrate methods for TB segmentation and signaling in accordance with aspects of the present disclosure.

FIG. 12 shows a flowchart illustrating a method 1200 for TB segmentation and signaling in accordance with various aspects of the present disclosure. The operations of method 1200 may be implemented by a device such as a UE 115 or a base station 105 (including, for example, transmitting device 260 described with reference to FIG. 2), or a wireless device 700, a wireless device 800, a TB segmentation manager 900, or their components as described with reference to FIGS. 1, 2, and 7 through 9. For example, the operations of method 1200 may be performed by the UE 115 or base station 105 as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1205, the UE 115 or base station 105 may identify a reference number of tones for an overhead channel of a TB as described above with reference to FIGS. 2 through 4. In certain examples, the operations of block 1205 may be performed by the reference tone manager as described with reference to FIGS. 8 and 9.

At block 1210, the UE 115 or base station 105 may segment the TB into a CB based on the reference number of tones for the overhead channel as described above with reference to FIGS. 2 through 4. In certain examples, the operations of block 1210 may be performed by the TB segmenter as described with reference to FIGS. 8 and 9.

Figure 13:
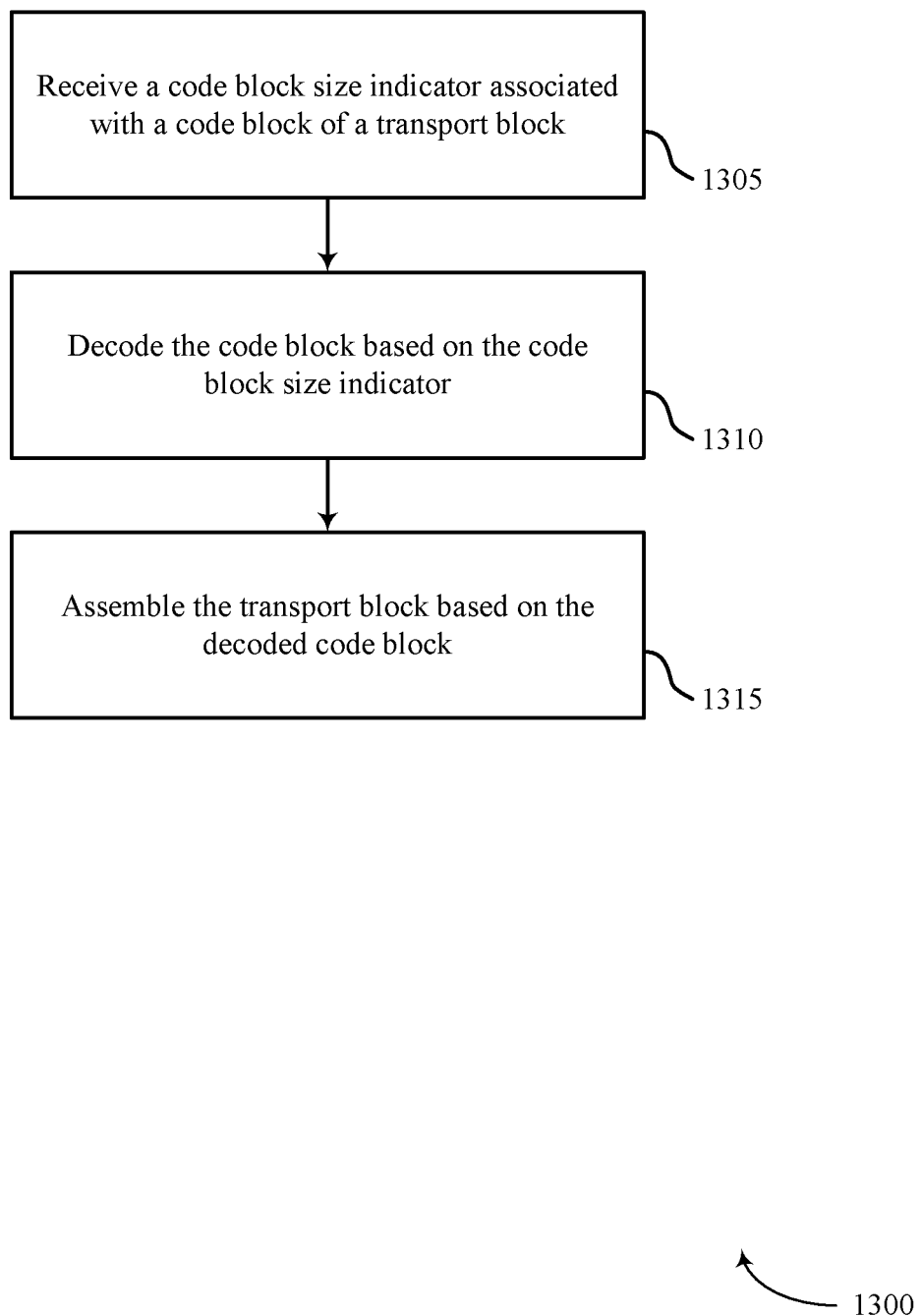

FIG. 13 shows a flowchart illustrating a method 1300 for TB segmentation and signaling in accordance with various aspects of the present disclosure. The operations of method 1300 may be implemented by a device such as a UE 115 or a base station 105 (including, for example, receiving device 250 described with reference to FIG. 2), or a wireless device 700, a wireless device 800, a TB segmentation manager 900, or their components as described with reference to FIGS. 1, 2, and 7 through 9. For example, the operations of method 1300 may be performed by the TB segmentation manager as described herein. In some examples, the UE 115 or base station 105 may execute a set of codes to control the functional elements of the device to perform the functions described below. Additionally or alternatively, the may perform aspects the functions described below using special-purpose hardware.

At block 1305, the UE 115 or base station 105 may receive a CB size indicator associated with a CB of a TB as described above with reference to FIGS. 2 through 4. In certain examples, the operations of block 1305 may be performed by the TB communication manager as described with reference to FIGS. 8 and 9.

At block 1310, the UE 115 or base station 105 may decode the CB based on the CB size indicator as described above with reference to FIGS. 2 through 4. In certain examples, the operations of block 1310 may be performed by the CB decoder as described with reference to FIGS. 8 and 9.

At block 1315, the UE 115 or base station 105 may assemble the TB based on the decoded CB as described above with reference to FIGS. 2 through 4. In certain examples, the operations of block 1315 may be performed by the TB assembler as described with reference to FIGS. 8 and 9.

Figure 14:
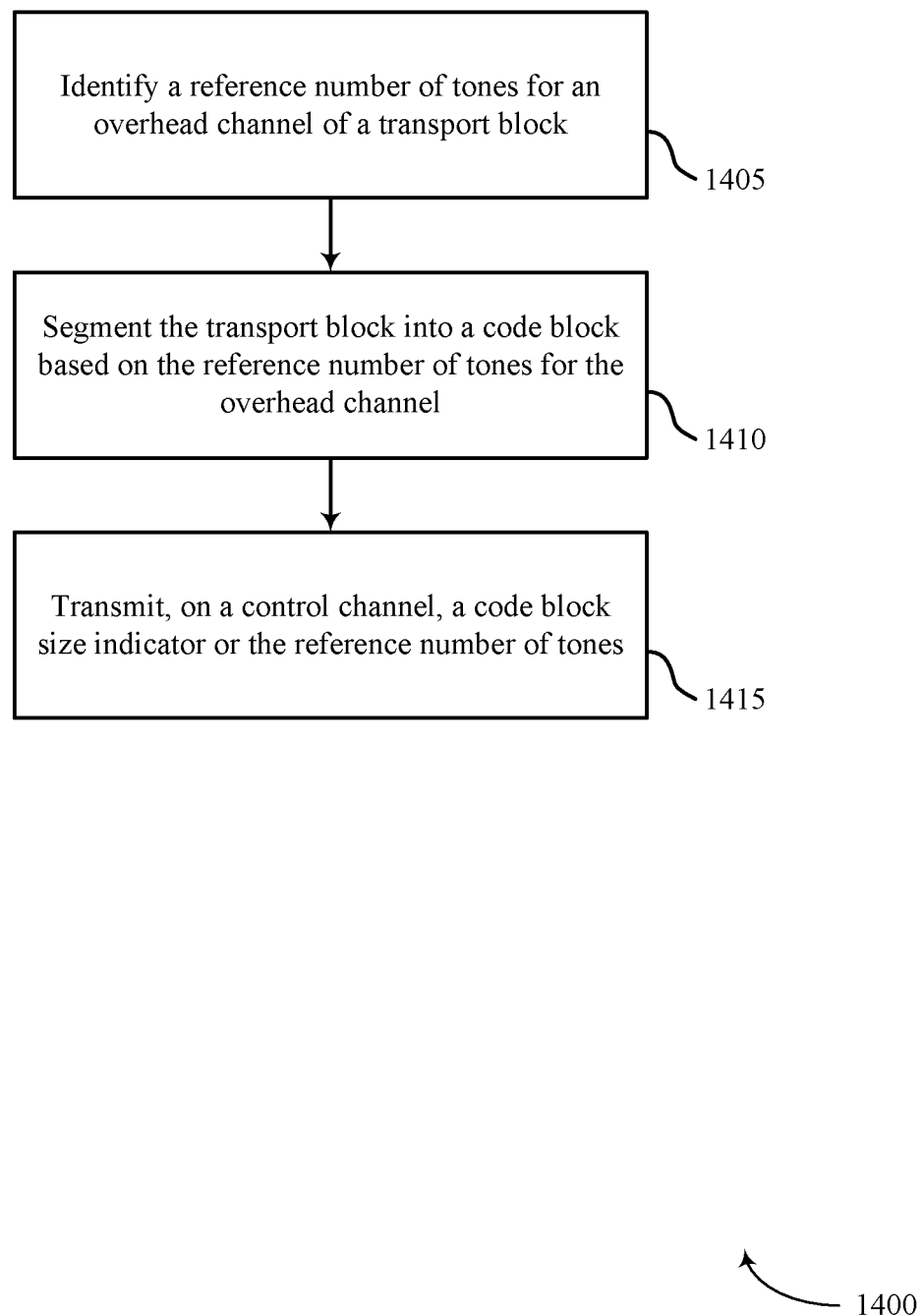

FIG. 14 shows a flowchart illustrating a method 1400 for TB segmentation and signaling in accordance with various aspects of the present disclosure. The operations of method 1400 may be implemented by a device such as a UE 115 or a base station 105 (including, for example, transmitting device 260 described with reference to FIG. 2), or a wireless device 700, a wireless device 800, a TB segmentation manager 900, or their components as described with reference to FIGS. 1, 2, and 7 through 9. For example, the operations of method 1400 may be performed by the TB segmentation manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1405, the UE 115 or base station 105 may identify a reference number of tones for an overhead channel of a TB as described above with reference to FIGS. 2 through 4. In certain examples, the operations of block 1405 may be performed by the reference tone manager as described with reference to FIGS. 8 and 9.

At block 1410, the UE 115 or base station 105 may segment the TB into a CB based on the reference number of tones for the overhead channel as described above with reference to FIGS. 2 through 4. In certain examples, the operations of block 1410 may be performed by the TB segmenter as described with reference to FIGS. 8 and 9.

At block 1415, the UE 115 or base station 105 may transmit, on a control channel, a CB size indicator or the reference number of tones as described above with reference to FIGS. 2 through 4. In certain examples, the operations of block 1415 may be performed by the TB segmenter as described with reference to FIGS. 8 and 9.

Figure 15:
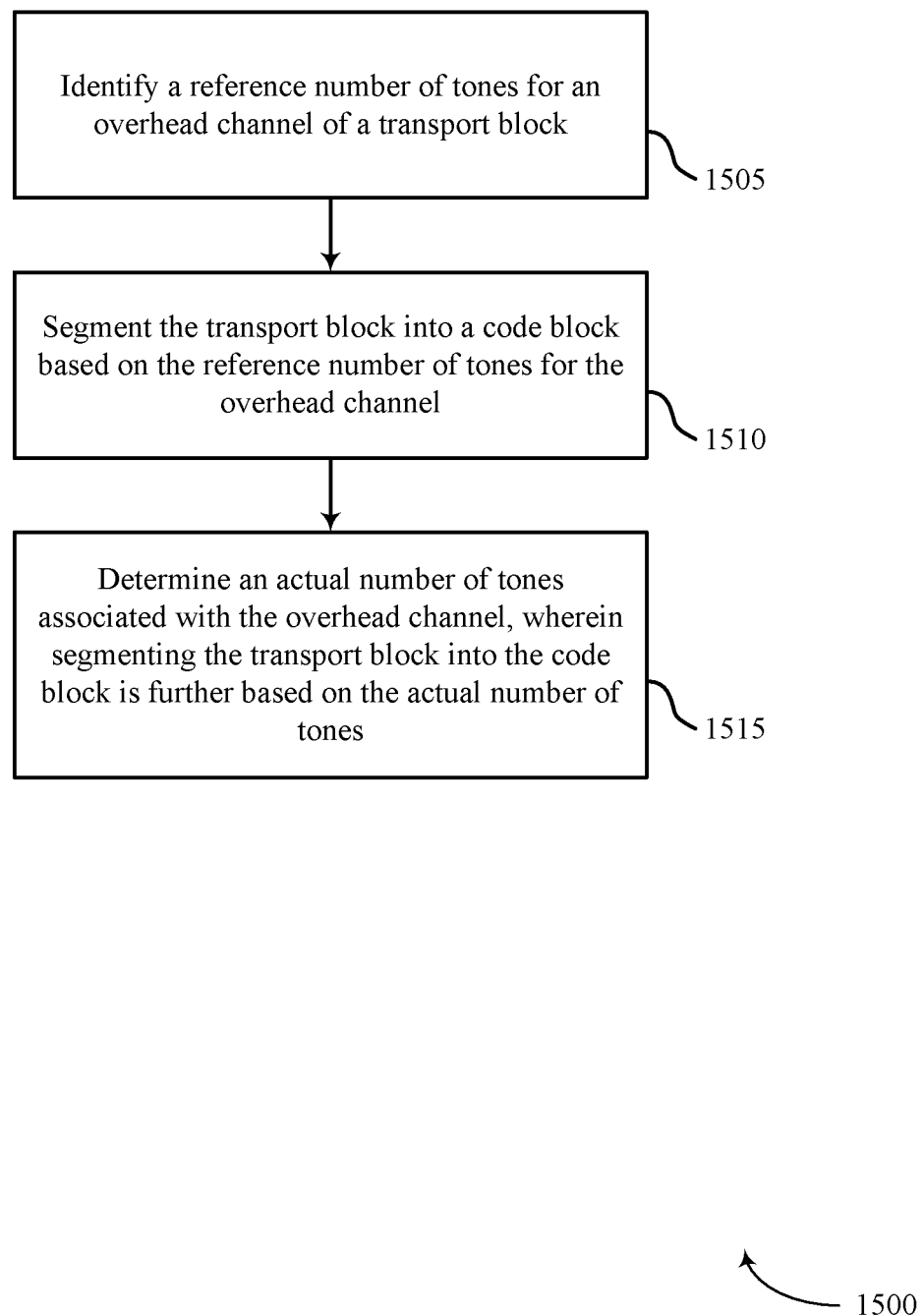

FIG. 15 shows a flowchart illustrating a method 1500 for TB segmentation and signaling in accordance with various aspects of the present disclosure. The operations of method 1500 may be implemented by a device such as a UE 115 or a base station 105 (including, for example, transmitting device 260 described with reference to FIG. 2), or a wireless device 700, a wireless device 800, a TB segmentation manager 900, or their components as described with reference to FIGS. 1, 2, and 7 through 9. For example, the operations of method 1500 may be performed by the TB segmentation manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1505, the UE 115 or base station 105 may identify a reference number of tones for an overhead channel of a TB as described above with reference to FIGS. 2 through 4. In certain examples, the operations of block 1505 may be performed by the reference tone manager as described with reference to FIGS. 8 and 9.

At block 1510, the UE 115 or base station 105 may segment the TB into a CB based on the reference number of tones for the overhead channel as described above with reference to FIGS. 2 through 4. In certain examples, the operations of block 1510 may be performed by the TB segmenter as described with reference to FIGS. 8 and 9.

At block 1515, the UE 115 or base station 105 may determine an actual number of tones associated with the overhead channel, wherein segmenting the TB into the CB is further based on the actual number of tones as described above with reference to FIGS. 2 through 4. In certain examples, the operations of block 1515 may be performed by the overhead channel resource manager as described with reference to FIGS. 8 and 9.

Figure 16:
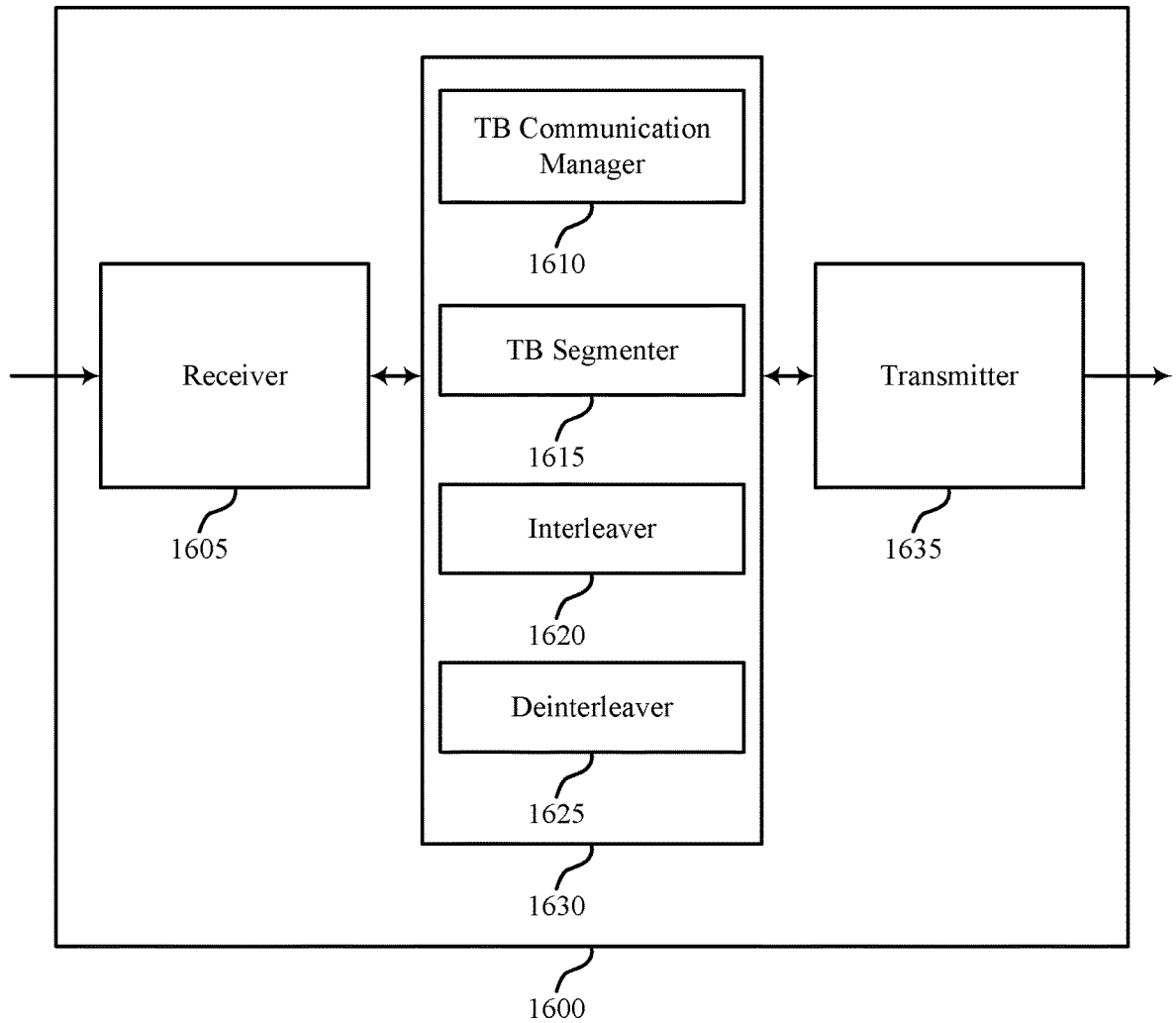
FIG. 16 illustrates a block diagram of a device that support interleaving and deinterleaving in accordance with aspects of the present disclosure.

FIG. 16 shows a block diagram of a wireless device 1600 that supports interleaving and deinterleaving in accordance with various aspects of the present disclosure. Wireless device 1600 may be an example of aspects of a wireless device 700 or a UE 115 or base station 105 described with reference to FIGS. 1, 2, and 7, including receiving device 250 and transmitting device 260 described with reference to FIG. 2. Wireless device 1600 may include receiver 1605, TB segmentation manager 1630, and transmitter 1635. Wireless device 1600 may also include a processor and memory. Each of these components may be in communication with each other.

The receiver 1605 may receive information which may be passed on to other components of the device. The receiver 1605 may also perform the functions described with reference to the receiver 705 of FIG. 7. The receiver 1605 may be an example of aspects of the transceiver 1025 described with reference to FIG. 10.

The TB segmentation manager 1630 may be an example of aspects of TB segmentation manager 715 described with reference to FIG. 7. The TB segmentation manager 1630 may include TB communication manager 1610, TB segmenter 1615, interleaver 1620, and a deinterleaver 1625. The TB segmentation manager 1630 may be an example of aspects of the TB segmentation manager 1005 described with reference to FIG. 10.

The TB communication manager 1610 may receive a CB size indicator associated with a CB of a TB, receive the CB size indicator using a control channel, and receive the reference number of tones using a control channel. In some cases, the CB size indicator is based at least in part on a reference number of tones associated with an overhead channel of the TB. In some cases, the reference number of tones is based at least in part on one or more of a control channel in a data region of the TB, a synchronization channel, or a CSI-RS. In some cases, the reference number of tones is based at least in part on one or more of a maximum number of tones, a minimum number of tones, or a median number of tones associated with the overhead channel. In some cases, the CB size indicator is based at least in part on an actual number of tones for an overhead channel associated with the TB. In some examples, the reference number of tones may be based at least in part on a communication link direction, which may be uplink, downlink, or sidelink.

The TB segmenter 1615 may identify a plurality of CBs of a TB segmented based at least in part on the reference number of tones for an overhead channel.

The interleaver 1620 may interleave tones of one or more CBs and may perform an interleaving process, such as the interleaving process described with reference to FIGS. 5A and 5B. The interleaving process may be performed for each symbol. In some examples, an RC interleaver process may be used to interleave the tones associated with one or more CBs to resources within a symbol. Bits may be interleaved based on possible overhead tones that exist in a given symbol or the reference number of tones for an overhead channel. For example, the tones associated with the one or more CBs may be interleaved around possible overhead tones such that only the tones associated with the one or more CBs are interleaved and the overhead tones are not interleaved. In some examples, the interleaving process may be performed prior to mapping the tones associated with the one or more CBs to available RBs and may be based at least in part on the available resources, the MCS, and the number of overhead tones, among other factors. In various examples, the bits for some CBs may have a different symbol location in the initial transmission when compared to retransmission. In some examples, the interleaver 1620 may determine an interleaver matrix based at least in part on a tone bundle size and a CB size associated with the plurality of CBs. The interleaver 1620 may interleave the plurality of CBs according to the interleaver matrix.

The deinterleaver 1625 may deinterleave tones of one or more CBs and may perform a deinterleaving process, such as the deinterleaving process described with reference to FIGS. 6A and 6B. The deinterleaver process may be performed to obtain and decode one or more CBs of a TB. In some examples, a deinterleaver matrix 650 (e.g., as shown in FIG. 6B) may be calculated based on a CB size indicator. The deinterleaver may deinterleave the tones of one or more CBs according to the deinterleaver matrix.

The transmitter 1635 may transmit signals received from other components of wireless device 1600. In some examples, the transmitter 1635 may be collocated with a receiver in a transceiver module. For example, the transmitter 1635 may be an example of aspects of the transceiver 1025 described with reference to FIG. 10. The transmitter 1635 may utilize a single antenna, or may utilize a plurality of antennas.

Figure 17:
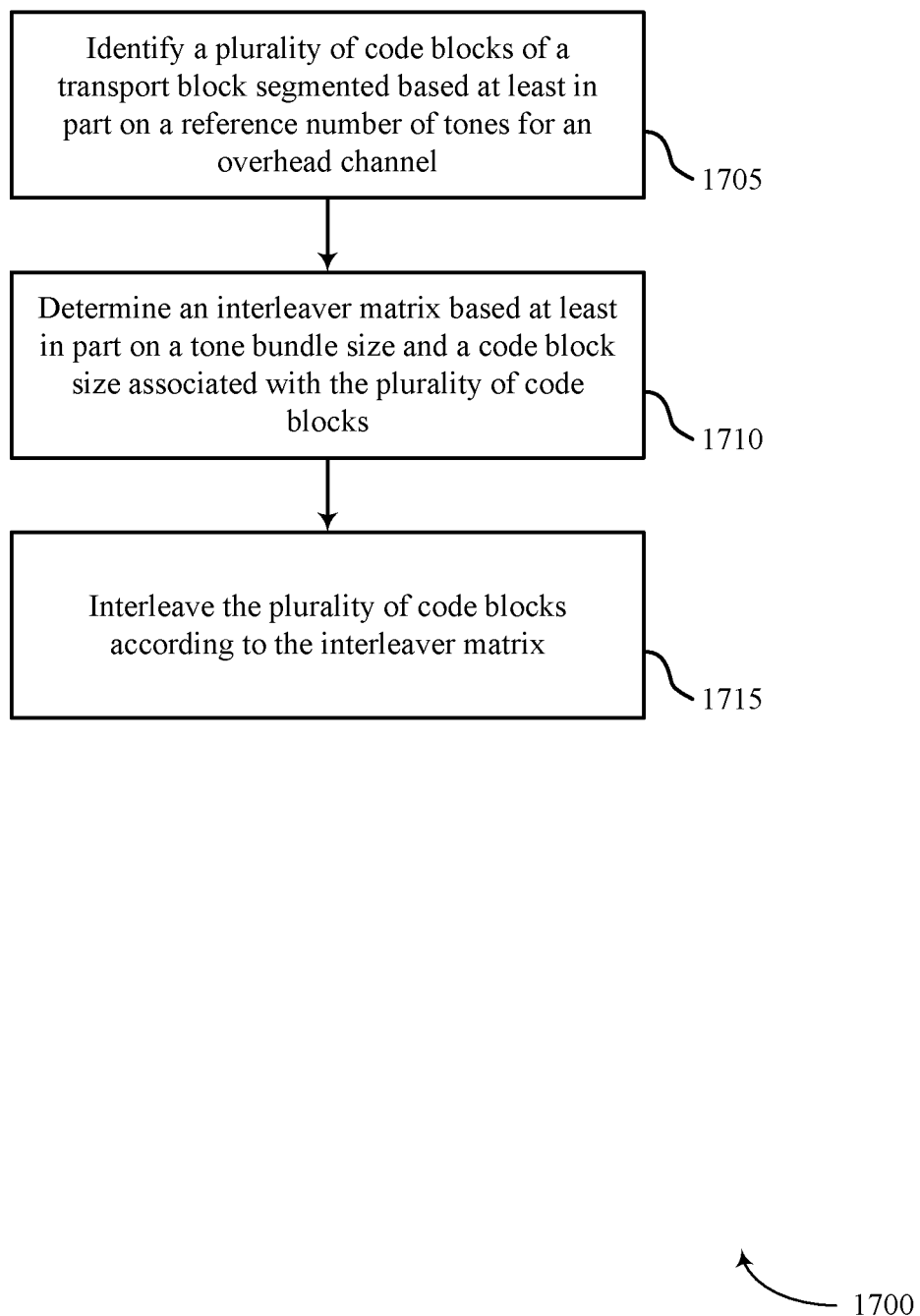
FIGS. 17 and 18 illustrate methods of interleaving and deinterleaving in accordance with aspects of the present disclosure.

FIG. 17 shows a flowchart illustrating a method 1700 for interleaving in accordance with various aspects of the present disclosure. The operations of method 1700 may be implemented by a device such as a UE 115 or a base station 105 (including, for example, transmitting device 260 described with reference to FIG. 2), or a wireless device 700, a wireless device 1600, or their components as described with reference to FIGS. 1, 2, and 7 and 16. For example, the operations of method 1700 may be performed by the TB segmentation manager as described herein. In some examples, the wireless device 700, UE 115, or base station 105 may execute a set of codes to control the functional elements of the device to perform the functions described below. Additionally or alternatively, the UE 115 or base station 105 may perform aspects the functions described below using special-purpose hardware.

At block 1705, the UE 115 or base station 105 may identify a plurality of CBs of a TB segmented based at least in part on a reference number of tones for an overhead channel as described above with reference to FIGS. 2 through 6, 7 through 9, and 16. In certain examples, the operations of block 1705 may be performed by the TB segmenter as described with reference to FIG. 16.

At block 1710, the UE 115 or base station 105 may determine an interleaver matrix based at least in part on a tone bundle size and a CB size associated with the plurality of CBs as described above with reference to FIGS. 2 through 6, 7 through 9, and 16. In certain examples, the operations of block 1710 may be performed by the interleaver as described with reference to FIG. 16.

At block 1715, the UE 115 or base station 105 may interleave the plurality of CBs according to the interleaver matrix as described above with reference to FIGS. 2 through 6, 7 through 9, and 16. In certain examples, the operations of block 1715 may be performed by the interleaver as described with reference to FIG. 16.

Figure 18:
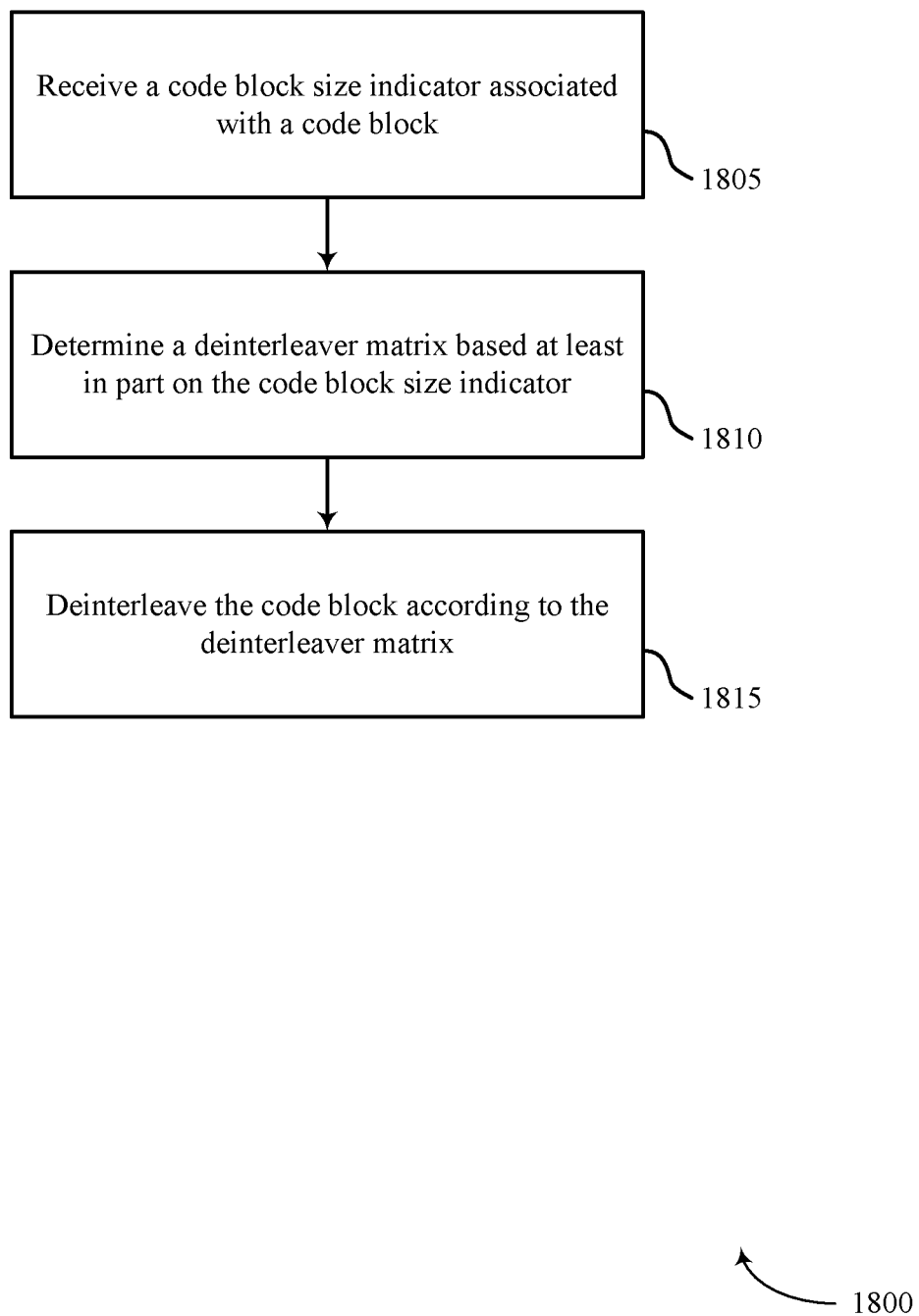

FIG. 18 shows a flowchart illustrating a method 1800 for deinterleaving in accordance with various aspects of the present disclosure. The operations of method 1800 may be implemented by a device such as a UE 115 or a base station 105 (including, for example, receiving device 250 described with reference to FIG. 2), or a wireless device 700, a wireless device 1600, or their components as described with reference to FIGS. 1, 2, and 7 and 16. For example, the operations of method 1800 may be performed by the TB segmentation manager as described herein. In some examples, the wireless device 700, UE 115, or base station 105 may execute a set of codes to control the functional elements of the device to perform the functions described below. Additionally or alternatively, the UE 115 or base station 105 may perform aspects the functions described below using special-purpose hardware.

At block 1805, the UE 115 or base station 105 may receive a CB size indicator associate with a CB as described above with reference to FIGS. 2 through 6, 7 through 9, and 16. In certain examples, the operations of block 1805 may be performed by the TB communication manager as described with reference to FIG. 16.

At block 1810, the UE 115 or base station 105 may determine a deinterleaver matrix based at least in part on the CB size indicator as described above with reference to FIGS. 2 through 6, 7 through 9 and 16. In certain examples, the operations of block 1810 may be performed by the deinterleaver as described with reference to FIG. 16.

At block 1815, the UE 115 or base station 105 may deinterleave the CB according to the deinterleaver matrix as described above with reference to FIGS. 2 through 6, 7 through 9, and 16. In certain examples, the operations of block 1815 may be performed by the deinterleaver as described with reference to FIG. 16. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for TB segmentation and signaling.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). LTE and LTE-A are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving an indication associated with a reference number of resources for an overhead channel based at least in part on a type of the overhead channel, wherein the type of the overhead channel comprises an uplink channel or a downlink channel;
   determining a number of resources available for data transmission based at least in part on the reference number of resources for the overhead channel;
   determining a size of a transport block based at least in part on the number of resources available for data transmission;
   segmenting the transport block into at least one code block based at least in part on the size of the transport block; and
   communicating the at least one code block over a communication link.

2. The method of claim 1, wherein the receiving comprises receiving, via a control channel, a code block size indicator or the reference number of resources for the overhead channel.

3. The method of claim 1, wherein the determining the size of the transport block is further based on a modulation order and coding scheme (MCS) indicator.

4. The method of claim 1, wherein the reference number of resources for the overhead channel is associated with a channel state information reference signal (CSI-RS).

5. The method of claim 1, wherein the reference number of resources for the overhead channel is associated with one or more of a control channel in a data region of the transport block, a synchronization channel, a maximum number of resources associated with the overhead channel, a minimum number of resources associated with the overhead channel, or a median number of resources associated with the overhead channel.

6. The method of claim 1, further comprising determining a first number of information bits for the transport block based at least in part on a number of code blocks associated with the transport block and a second number of information bits for the code blocks.

7. The method of claim 6, further comprising determining the second number of information bits for the code blocks based at least in part on a code block size and a code rate.

8. The method of claim 6, further comprising determining the number of code blocks associated with the transport block based at least in part on a number of resource blocks allocated for the transport block and the reference number of resources for the overhead channel.

9. The method of claim 1, further comprising determining a number of pad bits for the transport block based at least in part on an actual number of resources associated with the overhead channel.

10. The method of claim 1, further comprising determining a number of punctured bits for the at least one code block based at least in part on an actual number of resources associated with the overhead channel.

11. The method of claim 10, further comprising:
    identifying a plurality of resource bundles associated with the at least one code block;
    determining an interleaver matrix based at least in part on the number of punctured bits for the at least one code block; and
    interleaving the plurality of resource bundles according to the interleaver matrix.

12. The method of claim 1, further comprising:
    determining an interleaver matrix based at least in part on the reference number of resources for the overhead channel; and
    interleaving a plurality of resources of the at least one code block according to the interleaver matrix.

13. The method of claim 12, wherein interleaving the plurality of resources comprises:
    writing the plurality of resources to elements of the interleaver matrix according to a first order; and
    reading the elements of the interleaver matrix according to a second order.

14. An apparatus for wireless communications, comprising:
    a processor; and
    memory coupled to the processor, wherein the processor is configured to:
    receive an indication associated with a reference number of resources for an overhead channel based at least in part on a type of the overhead channel, wherein the type of the overhead channel comprises an uplink channel or a downlink channel;
    determine a number of resources available for data transmission based at least in part on the reference number of resources for the overhead channel, determine a size of a transport block based at least in part on the number of resources available for data transmission, segment the transport block into at least one code block based at least in part on the size of the transport block, and communicate the at least one code block over a communication link.

15. The apparatus of claim 14, wherein the processor configured to receive is further configured to receive, via a control channel, a code block size indicator or the reference number of resources for the overhead channel.

16. The apparatus of claim 14, wherein the processor configured to determine the size of the transport block is further configured to determine the size of the transport block based on a modulation order and coding scheme (MCS) indicator.

17. The apparatus of claim 14, wherein the reference number of resources for the overhead channel is associated with a channel state information reference signal (CSI-RS).

18. The apparatus of claim 14, wherein the reference number of resources for the overhead channel is associated with one or more of a control channel in a data region of the transport block, a synchronization channel, a maximum number of resources associated with the overhead channel, a minimum number of resources associated with the overhead channel, or a median number of resources associated with the overhead channel.

19. The apparatus of claim 14, wherein the processor is further configured to determine a first number of information bits for the transport block based at least in part on a number of code blocks associated with the transport block and a second number of information bits for the code blocks.

20. The apparatus of claim 19, wherein the processor is further configured to determine the second number of information bits for the code blocks based at least in part on a code block size and a code rate.

21. The apparatus of claim 19, wherein the processor is further configured to determine the number of code blocks associated with the transport block based at least in part on a number of resource blocks allocated for the transport block and the reference number of resources for the overhead channel.

22. The apparatus of claim 14, wherein the processor is further configured to determine a number of pad bits for the transport block based at least in part on an actual number of resources associated with the overhead channel.

23. The apparatus of claim 14, wherein the processor is further configured to determine a number of punctured bits for the at least one code block based at least in part on an actual number of resources associated with the overhead channel.

24. The apparatus of claim 23, wherein the processor is further configured to:
identify a plurality of resource bundles associated with the at least one code block;
determine an interleaver matrix based at least in part on the number of punctured bits for the at least one code block; and
interleave the plurality of resource bundles according to the interleaver matrix.

25. The apparatus of claim 14, wherein the processor is further configured to:
determine an interleaver matrix based at least in part on the reference number of resources for the overhead channel; and
interleave a plurality of resources of the at least one code block according to the interleaver matrix.

26. The apparatus of claim 25, wherein the processor configured to interleave the plurality of resources is further configured to:
write the plurality of resources to elements of the interleaver matrix according to a first order; and
read the elements of the interleaver matrix according to a second order.

* * * * *